US011933459B2

(12) United States Patent
Wang et al.

(10) Patent No.: US 11,933,459 B2
(45) Date of Patent: Mar. 19, 2024

(54) LAMP INCLUDING REDUCED PHOSPHOR LIGHT EMITTING DIODE FILAMENTS

(71) Applicant: LEDVANCE LLC, Wilmington, MA (US)

(72) Inventors: Xingrong Wang, Shenzhen (CN); Tianzheng Jiang, Shenzhen (CN); Ming Li, Acton, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 17/729,632

(22) Filed: Apr. 26, 2022

(65) Prior Publication Data

US 2023/0341095 A1 Oct. 26, 2023

(51) Int. Cl.
*F21K 9/232* (2016.01)

(52) U.S. Cl.
CPC .................................... *F21K 9/232* (2016.08)

(58) Field of Classification Search
CPC ......... F21K 9/64; H01L 33/50; H01L 33/502; H01L 33/52; H01L 33/56; H01L 2924/181; F21Y 2107/30; F21Y 2107/40; F21Y 2107/70; F21Y 2107/80; F21S 4/28; F21V 3/061
See application file for complete search history.

(56) References Cited

U.S. PATENT DOCUMENTS

2013/0058080 A1* 3/2013 Ge ....................... H05B 45/357 362/249.02
2013/0120967 A1* 5/2013 Liao ...................... H01L 33/486 257/E33.061
2013/0235593 A1* 9/2013 Takeuchi .............. F21V 23/001 362/363
2016/0363267 A1* 12/2016 Jiang ....................... F21K 9/232
2019/0191516 A1* 6/2019 Li .......................... H05B 33/14

FOREIGN PATENT DOCUMENTS

CN 208951719 U * 6/2019 ............. F21K 9/232
WO WO-2016011609 A1 * 1/2016 ................ F21S 2/00

OTHER PUBLICATIONS

SEARCH English translation of CN 208951719 U (Year: 2019).*
SEARCH English translation of WO 2016011609 (Year: 2016).*
(Continued)

*Primary Examiner* — Omar Rojas Cadima
(74) *Attorney, Agent, or Firm* — Harry Hild

(57) ABSTRACT

A lamp including electrical leads extending into a supporting stem that are in communication with a base electrode for engagement to a light fixture; and a light engine comprising light emitting diode filaments that are in electrical communication with the electrical leads. The light emitting diode filaments including a circuit having a plurality of contact pads arranged along a length of a substrate. The light emitting diode filaments further include light emitting diode (LED) chips engaged to the contact pads along the length of the substrate to provide that the light emitting diode (LED) chips are electrically connected in series. In some embodiments, each light emitting diode (LED) chip includes at least a light transmission surface that is in contact with an individual portion of phosphor for the LED chip. In other embodiments, a phosphor layer extends over an island of LED chips.

20 Claims, 18 Drawing Sheets

(56) References Cited

OTHER PUBLICATIONS

Wang, Xinrong et al., U.S. Appl. No. 17/517,037, filed Nov. 2021, 28 pages.
Wang, Xinrong et al., U.S. Appl. No. 17/517,158, filed Nov. 2021, 31 pages.
Anonymous, "What is a CSP LED Chip and how is it different from an SMD LED chip?", https://blog.betterautomotivelighting.com/what-is-a-csp-led-chip-and-how-is-it-different-from-an-smd-led-chip#:~:text=CSP%2C%20or%20Chip%Scale%20Package,and%20reduce%20possible%20failure%20points, Apr. 2022, 2 pages.

* cited by examiner

LAMP INCLUDING REDUCED PHOSPHOR LIGHT EMITTING DIODE FILAMENTS

TECHNICAL FIELD

The present disclosure generally relates to light engines employed in lamp assemblies, and more particularly to light engines employing light emitting diode filaments for the light source.

BACKGROUND

Conservation and management of electrical power are a growing concern with regard to both cost and environmental impact. In various lighting applications, the use of light emitting diodes (LEDs) for illumination is beginning to emerge as a lighting source with potential for addressing these concerns. LED light sources have a long life, are energy efficient, are durable and operate over a wide temperature range.

An LED filament light bulb is an LED lamp which is designed to resemble a traditional incandescent light bulb with visible filaments for aesthetic and light distribution purposes, but with the high efficiency of light-emitting diodes (LEDs). It produces its light using LED filaments, which are series-connected strings of diodes that resemble in appearance the filaments of incandescent light bulbs. They are direct replacements for conventional clear (or frosted) incandescent bulbs, as they are made with the same envelope shapes, the same bases that fit the same sockets, and work at the same supply voltage.

SUMMARY

In one aspect, the methods and structures of the present disclosure reduces the amount of phosphor employed in Light Emitting Diode (LED) filament.

In one embodiment the present disclosure provides a lamp including light emitting diode filaments including chip scale package light emitting diodes and a phosphor layer configured to reduce the yellow appearance of the lamp when the lamp is in the off state In one embodiment, the lamp includes electrical leads extending into a supporting stem. The electrical leads are in communication with a base electrode for engagement to a light fixture. The light engine further includes light emitting diode filaments that are in electrical communication with the electrical leads. The light emitting diode filaments including a circuit with a plurality of contact pads arranged along a length of a substrate. The light emitting diode filaments further including light emitting diode (LED) chips engaged to the contact pads along the length of the substrate to provide that the light emitting diode (LED) chips are electrically connected in series. In some embodiments, each light emitting diode (LED) chip includes at least a light transmission surface that is in contact with an individual portion of phosphor for the LED chip In another embodiment, the present disclosure provides a lamp including light emitting diode filaments including flip chip light emitting diodes and a phosphor layer configured to reduce the yellow appearance of the lamp when the lamp is in the off state. In one embodiment, the lamp includes electrical leads extending into a supporting stem. The electrical leads are in communication with a base electrode for engagement to a light fixture. The light engine further includes light emitting diode filaments that are in electrical communication with the electrical leads. The light emitting diode filaments including a circuit with a plurality of contact pads arranged along a length of a substrate. The light emitting diode filaments further including light emitting diode (LED) chips engaged to the contact pads along the length of the substrate to provide that the light emitting diode (LED) chips are electrically connected in series. In some embodiments, each light emitting diode (LED) chip includes at least a light transmission surface that is in contact with an individual portion of phosphor for the LED chip.

BRIEF DESCRIPTION OF THE DRAWINGS

The following description will provide details of embodiments with reference to the following figures wherein.

light emitting diodes (LEDs) and/or flip chip light emitting diodes (LEDs), in which the filaments have a reduced amount of phosphor and have been configured to be define a perimeter having an octagon geometry arranged on a single plane, the perimeter around a central axis of the stem, in accordance with one embodiment of the present disclosure.

Figure 9:
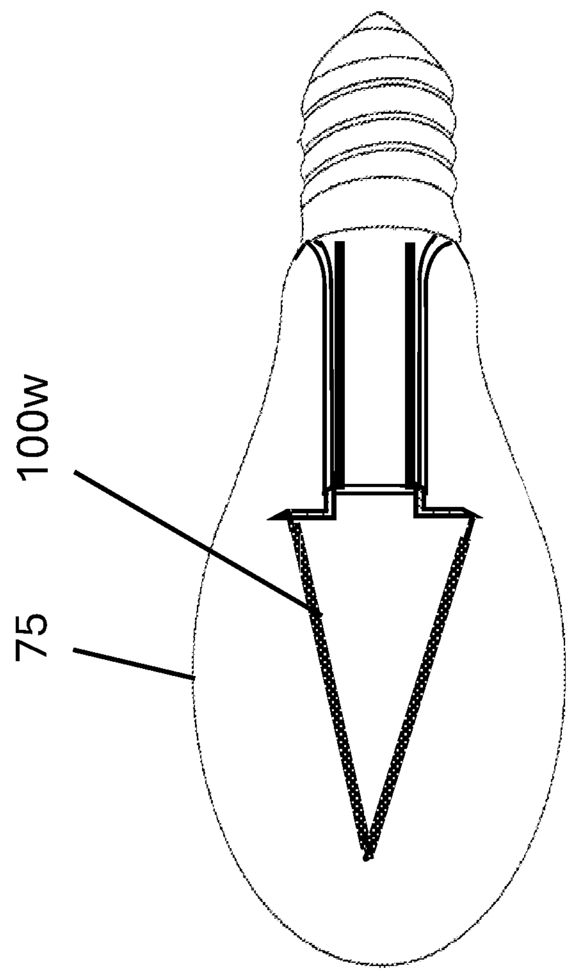

FIG. 9 is a photograph of a lamp including filament type light sources that can include chip scale package (CSP) light emitting diodes (LEDs) and/or flip chip light emitting diodes (LEDs), in which the filaments have a reduced amount of phosphor and have been configured to be define a single chevron (having an apex at the top) positioned within a candle shaped bulb, in accordance with one embodiment of the present disclosure.

Figure 10:
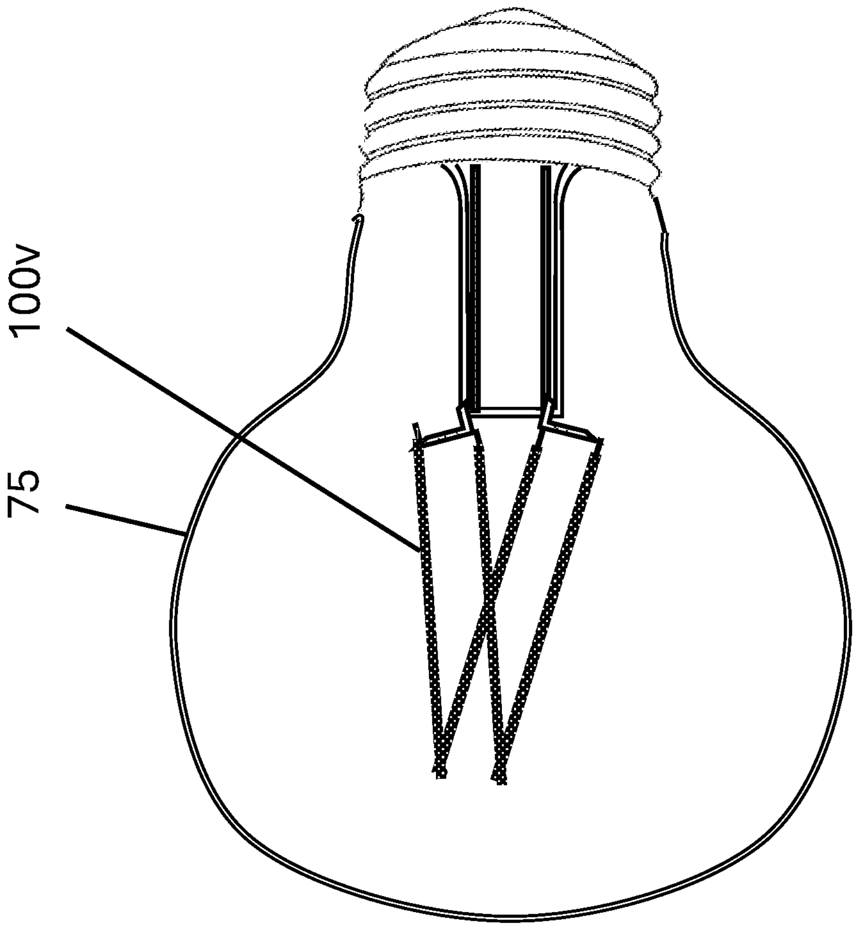

FIG. 10 is a photograph of a lamp including filament type light sources that can include chip scale package (CSP) light emitting diodes (LEDs) and/or flip chip light emitting diodes (LEDs), in which the filaments have a reduced amount of phosphor and have been configured to be define a two chevrons positioned within a globe shaped bulb, in accordance with one embodiment of the present disclosure.

Figure 11:
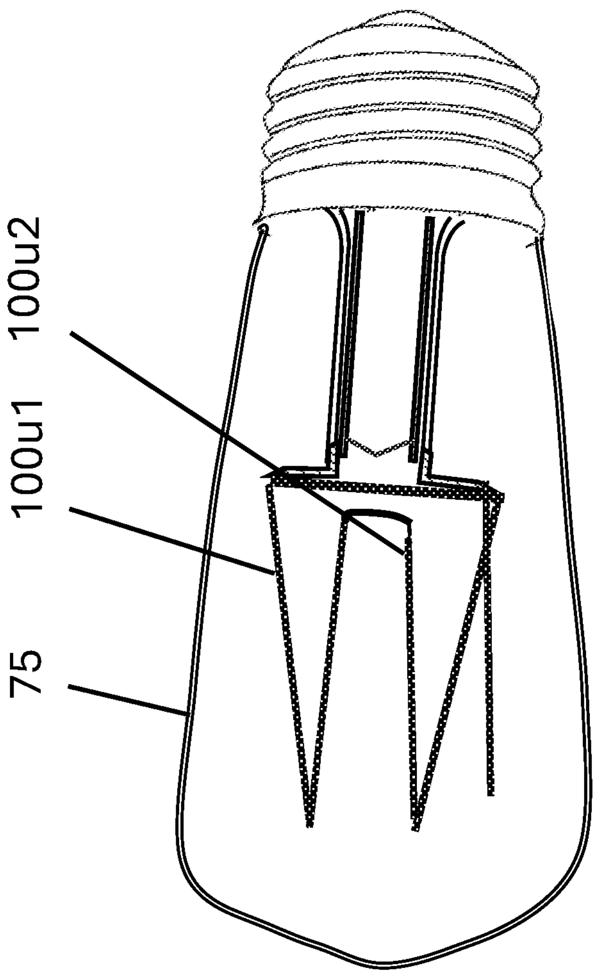

FIG. 11 is a photograph of a lamp including filament type light sources that can include six (6) chip scale package (CSP) light emitting diodes (LEDs) and/or flip chip light emitting diodes (LEDs), in which the filaments have a reduced amount of phosphor and have been configured to be define a light engine element of two chevrons each composed of two filaments to provide two apexes, and connected by base filaments, the light engine positioned within a globe shaped bulb, in accordance with one embodiment of the present disclosure.

Figure 12:
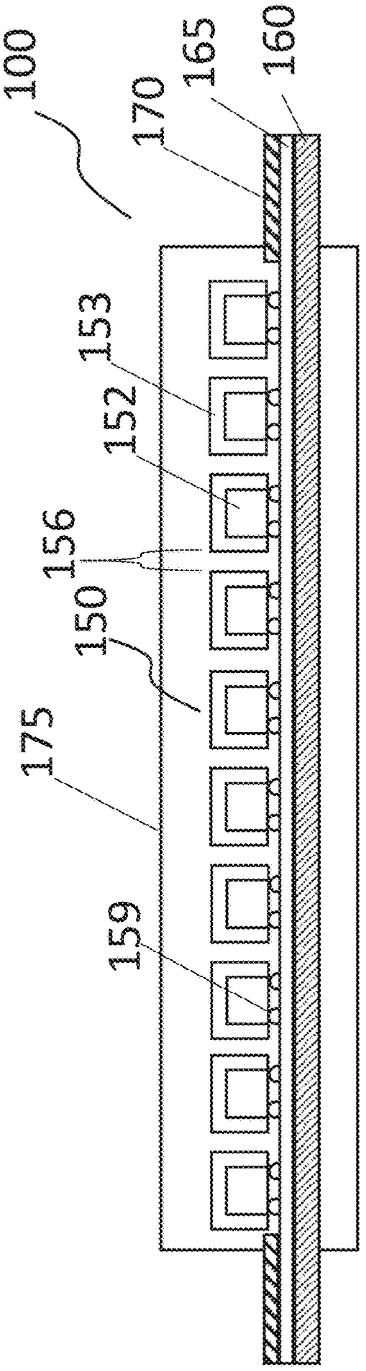

FIG. 12 is a side cross-sectional view of the filament assembly including at Chip Scale Package (CSP) Light Emitting Diode (LEDs), in accordance with one embodiment of the present disclosure.

Figure 13:
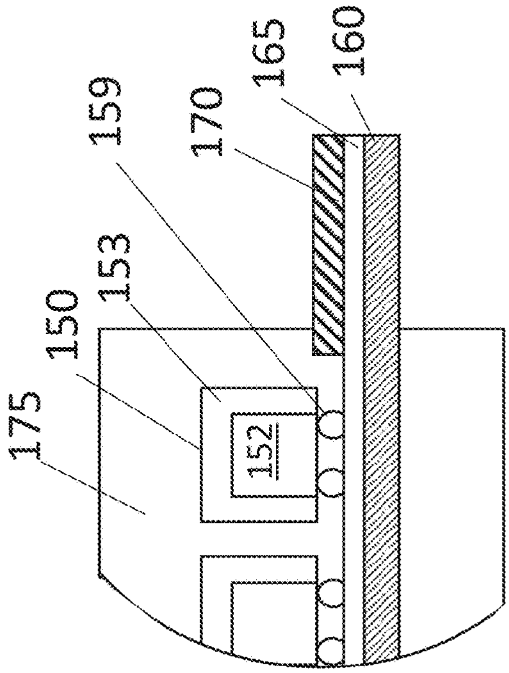

FIG. 13 is a magnified view of the Chip Scale Package (CSP) Light Emitting Diode (LEDs) being engaged to a filament substrate depicted in FIG. 12.

Figure 14:
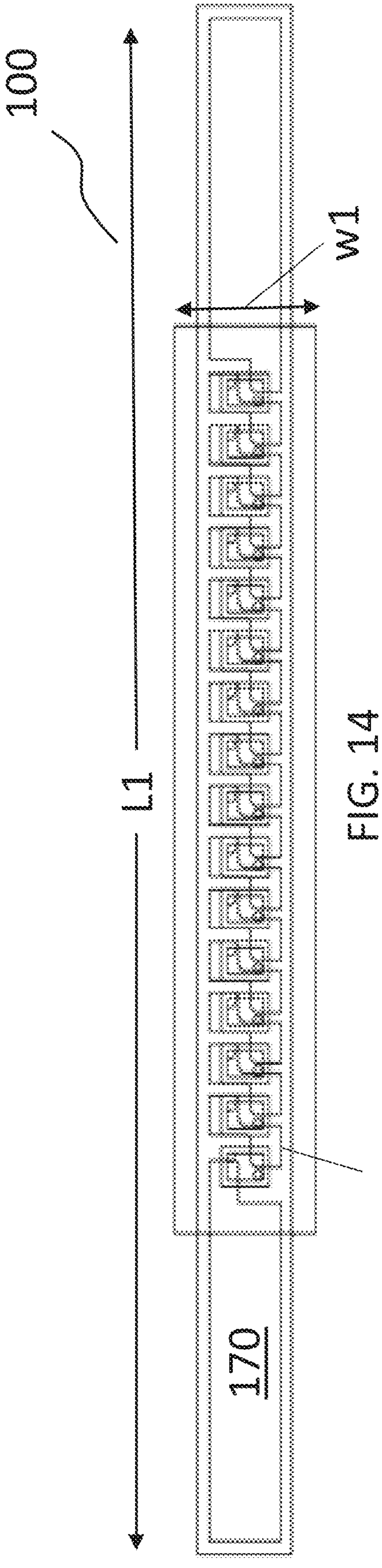

FIG. 14 is a top down view of a filament assembly including at Chip Scale Package (CSP) Light Emitting Diode (LEDs) illustrating the printed circuit providing electrical communication to the filament assembly including at Chip Scale Package (CSP) Light Emitting Diode (LEDs), in accordance with one embodiment of the present disclosure.

Figure 15:
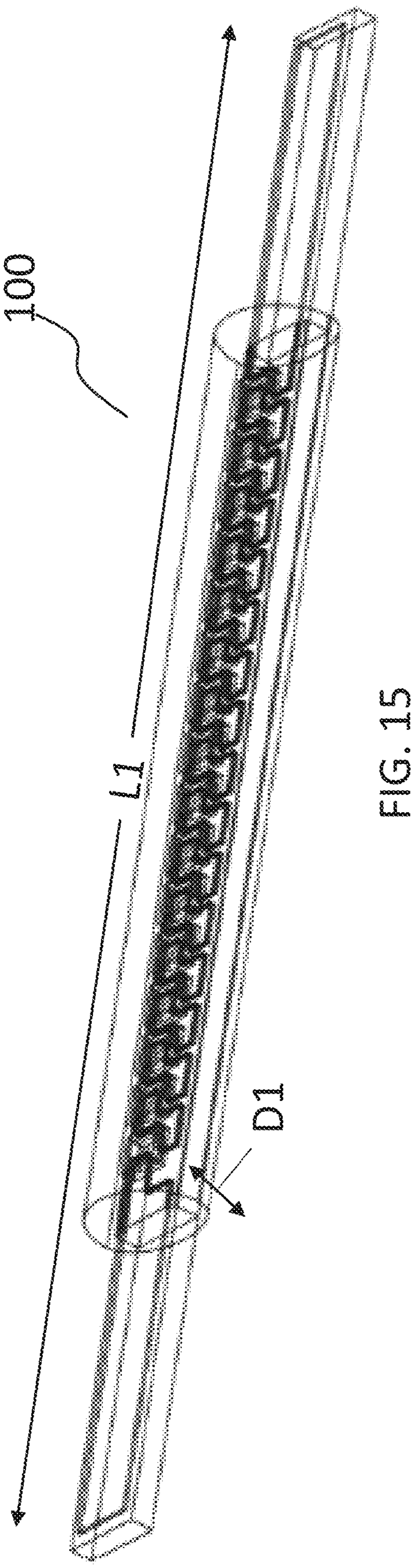

FIG. 15 is a perspective view of one embodiment of a Light Emitting Diode (LED) filament assembly including Chip Scale Package (CSP) Light Emitting Diode (LEDs), in accordance with one embodiment of the present disclosure.

Figure 16:
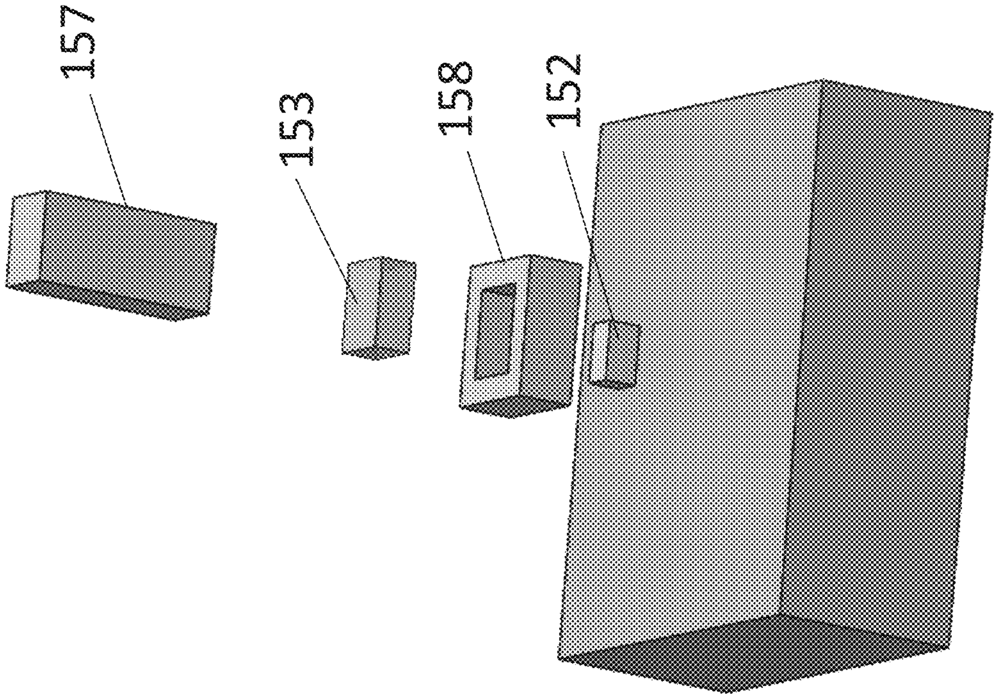

FIG. 16 is a perspective view illustrating the tooling for forming a phosphor layer on a Light Emitting Diode (LED), in accordance with one embodiment of the present disclosure.

Figure 17:
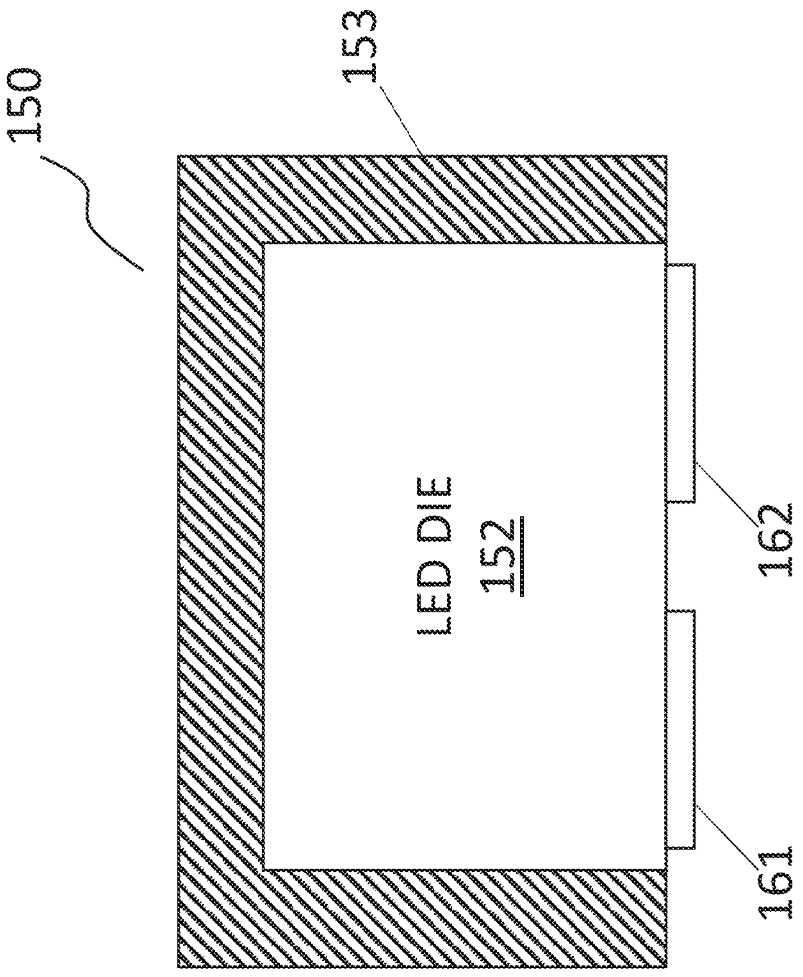

FIG. 17 is a side cross-sectional view of a Chip Scale Package (CSP) Light Emitting Diode (LED), in accordance with one embodiment of the present disclosure.

Figure 18:
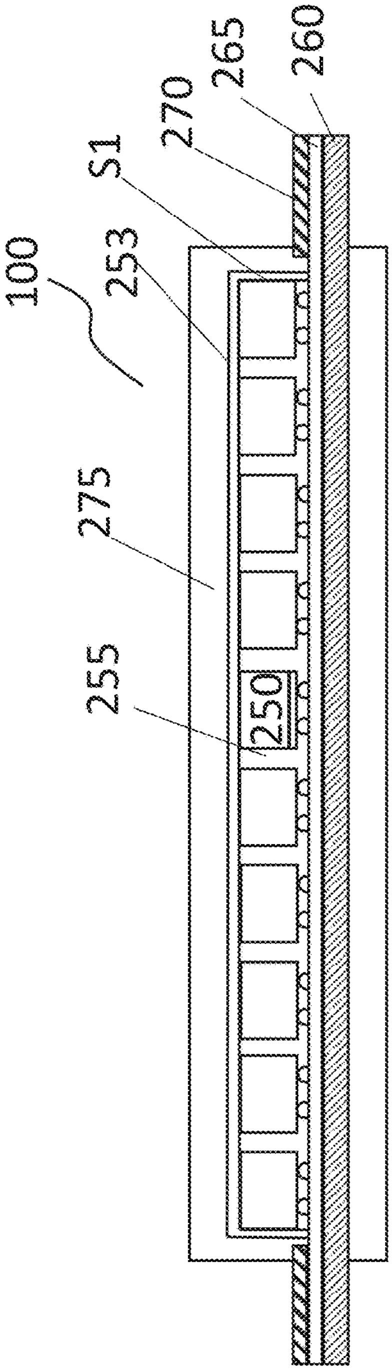

FIG. 18 is a side cross-sectional view of the filament assembly including Flip Chip (FC) Light Emitting Diode (LEDs), in accordance with one embodiment of the present disclosure.

Figure 19:
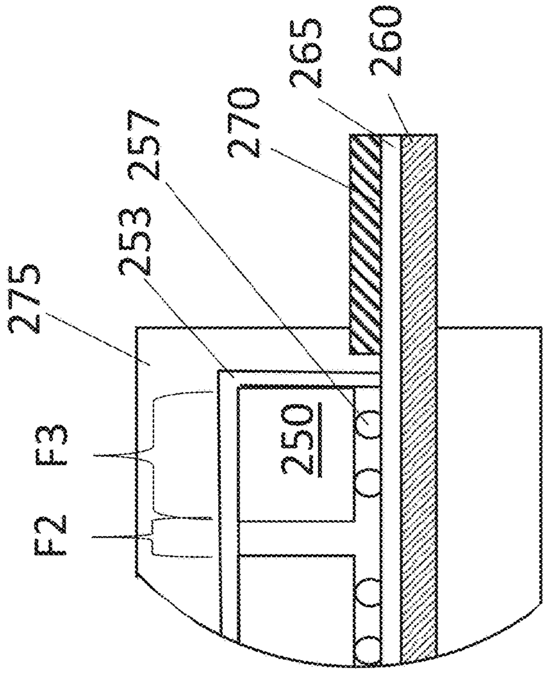

FIG. 19 is a magnified view of Flip Chip (FC) Light Emitting Diode (LEDs) being engaged to a filament substrate depicted in FIG. 18.

Figure 20:
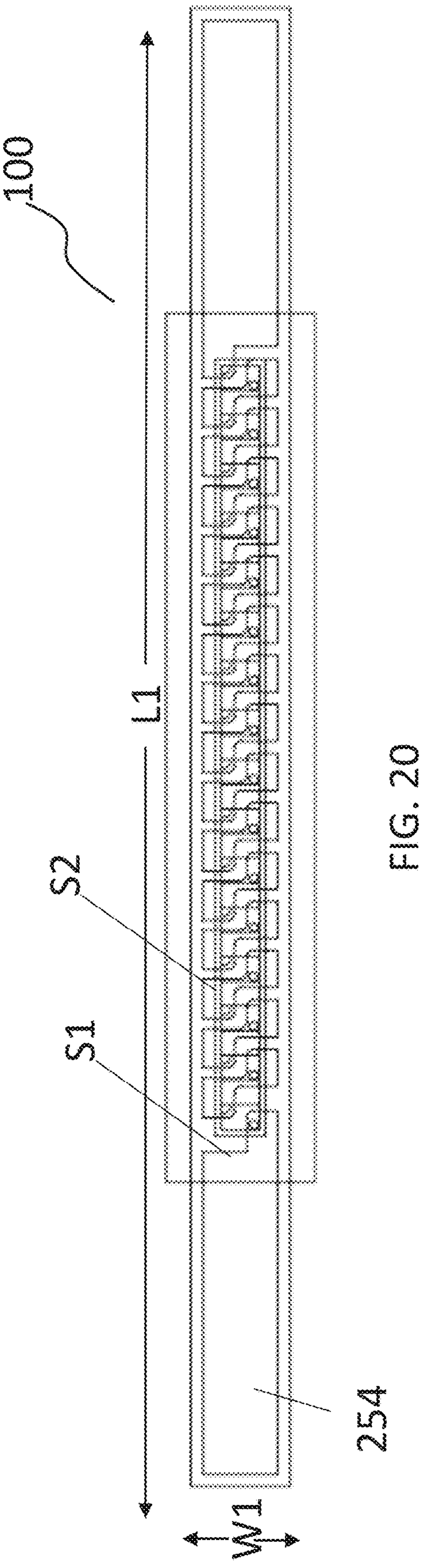

FIG. 20 is a top down view of a filament assembly including a Flip Chip (FC) Light Emitting Diode (LEDs) illustrating the printed circuit providing electrical communication to the filament assembly including at Flip Chip (FC) Light Emitting Diode (LEDs), in accordance with one embodiment of the present disclosure.

Figure 21:
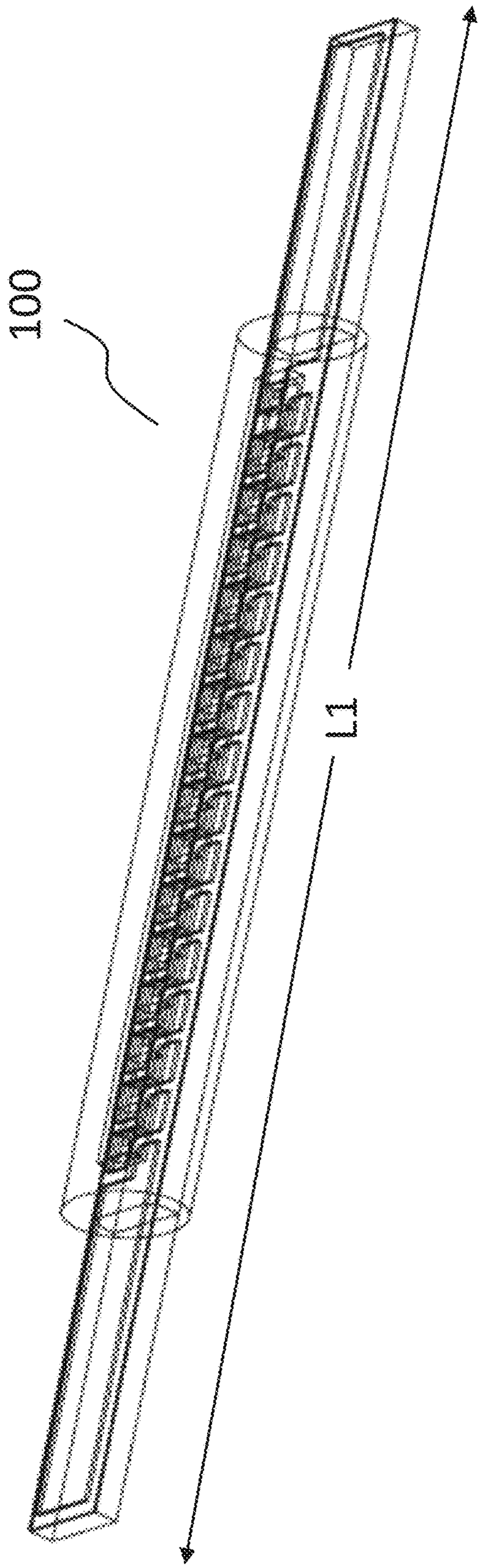

FIG. 21 is a perspective view of one embodiment of a Light Emitting Diode (LED) filament assembly including Flip Chip (FC) Light Emitting Diode (LEDs), in accordance with one embodiment of the present disclosure.

Figure 22C:
Figure 22A:
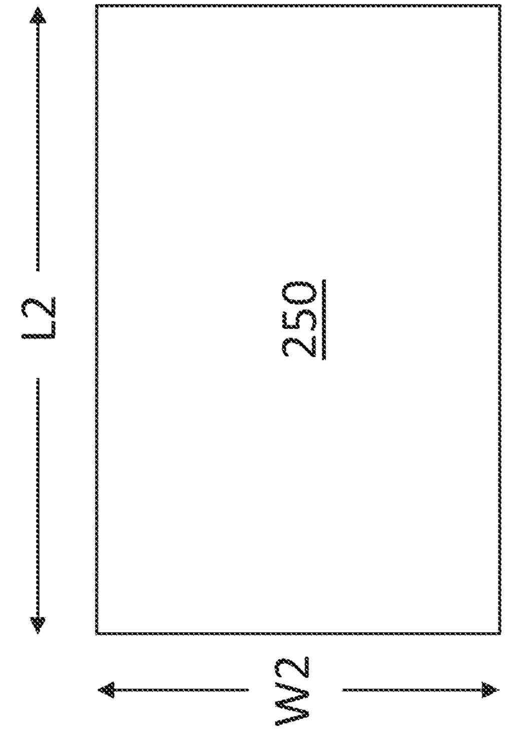

FIG. 22A is a top view of a Flip Chip (FC) Light Emitting Diode (LED), in accordance with one embodiment of the present disclosure.

Figure 22B:
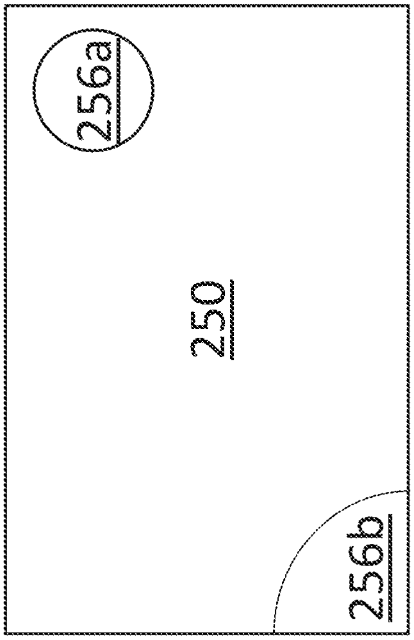

FIG. 22B is a bottom view of a Flip Chip (FC) Light Emitting Diode (LED), in accordance with one embodiment of the present disclosure.

FIG. 22C is a side view of a Flip Chip (FC) Light Emitting Diode (LED), in accordance with one embodiment of the present disclosure.

DETAILED DESCRIPTION

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

LED filament bulbs are designed to mimic the appearance of a tungsten filament. However, LED filament bulbs prior to the methods and structures disclosed herein contain yellow filament appearing filaments with millimeter level thickness. Example lengths for the filaments can be 53 mm, 40 mm and 68 mm. These are just examples of the lengths of prior filaments, which have a yellow appearance.

In some examples, the LED filament include multiple series-connected light emitting diodes LEDs on a transparent substrate, referred to as chip-on-glass (COG). These transparent substrates are made of glass or sapphire materials. This transparency allows the emitted light to disperse evenly and uniformly without any interference. An even coating of yellow phosphor in a silicone resin binder material converts the blue light generated by the LEDs into light approximating white light of the desired color temperature, e.g., 2700 K to match the warm white of an incandescent bulb. However, LED filaments used in lamps often have yellow appearance, especially the lamp is under power off status. The typical structure of these filaments is consisted by led chip, stents or substrate, silicon glue mixed with phosphor, led chips stamped on led stents, then coat the silicon glue which mix the yellow color phosphor powder.

Although, the filament lamp meets the requirement of traditional lighting requirement, but the yellow color on the filament is eye-catching, and unattractive, when the lamp is off. This is especially the case when employed in light fixtures having a geometry and style for a traditional or retro-styled lighting fixture, such as crystal chandeliers.

The structures and methods of the present disclosure can provide light emitting diode (LED) filaments that look inconspicuous, when it is used in build lamps. The structures and methods employ a reduced amount of phosphor. The LED filaments described herein have a reduced size and employ a thin layer of phosphor. A combination of the size, geometry and thickness of the filament components related to the layer of phosphor help to provide lamp designs incorporating the filaments, which do not include the highly distinctive yellow color of designs including a greater amount of phosphor.

In some embodiments, to provide filaments including a reduced phosphor content, the methods and structures begin with a filament geometry that is relatively small. For example, the length can range from 10 mm to 20 mm, and the width generally ranges from 0.8 mm to 2.0 mm. The diameter of a filament can range from 0.6 mm to 2 mm.

In some embodiments, providing the filaments can begin with starting with a very narrow (1 mm level) substrate that is made with sapphire (e.g., $Al_2O_3$), or ceramic material. In some embodiments, a large blue light emitting diode (LED) chip is coated with yellow phosphor. The die is then populated onto the substrate having the aforementioned dimensions. In some embodiments, instead of a single larger die, multiple smaller die may be employed. In a following step the entire light emitting diode (LED) populated substrate is coated with a clear adhesive. This method, and the resultant structure, can solve two problems. First, the clear adhesive does not appear yellow, and the amount of phosphor (which is yellow) is reduced, which ultimately reduces the yellow appearance of the filament. Second, in addition to the yellow appearance of the filament being reduced by the limited use of phosphor and the clear encapsulant, the filaments themselves are reduced in size. The narrower width and shorter length filaments, when incorporated into the light engine of a lamp further reduce the yellow appearance of the filaments, when compared to larger filaments having thicker coatings of phosphor.

In some embodiments, the light emitting diodes incorporated into the filaments of the lamps provided by the present disclosure may be chip scale package (CSP) light emitting diodes Chip Scale Package (CSP) LEDs are Lambertian emitters presenting the highest luminance at smallest size available on the market. Chip scale package without bond wires or need for spacing makes them the perfect fit for dense clustering and high luminous flux output. When employing chip scale package LEDs, the LEDs are attached to a substrate, in which a printed circuit provides for electrical communications to the individual CSP LEDs. In this embodiment, the CSP LED arrays are then coated with a transparent material having a very high transmittance. This embodiment reduce the use of phosphor layers. Some examples of CSP LEDs, and methods disclosing CSP LEDs have been described with reference to FIGS. 9-16. Examples of filaments employed in the lamp designs of the present disclosure have been described with reference to FIGS. 17-19C.

By eliminating the phosphor, the yellow coloring that is necessarily associated with phosphor is also eliminated from the design. The methods and structures of the present disclosure are now described with reference to FIGS. 1-22C.

Figure 1:
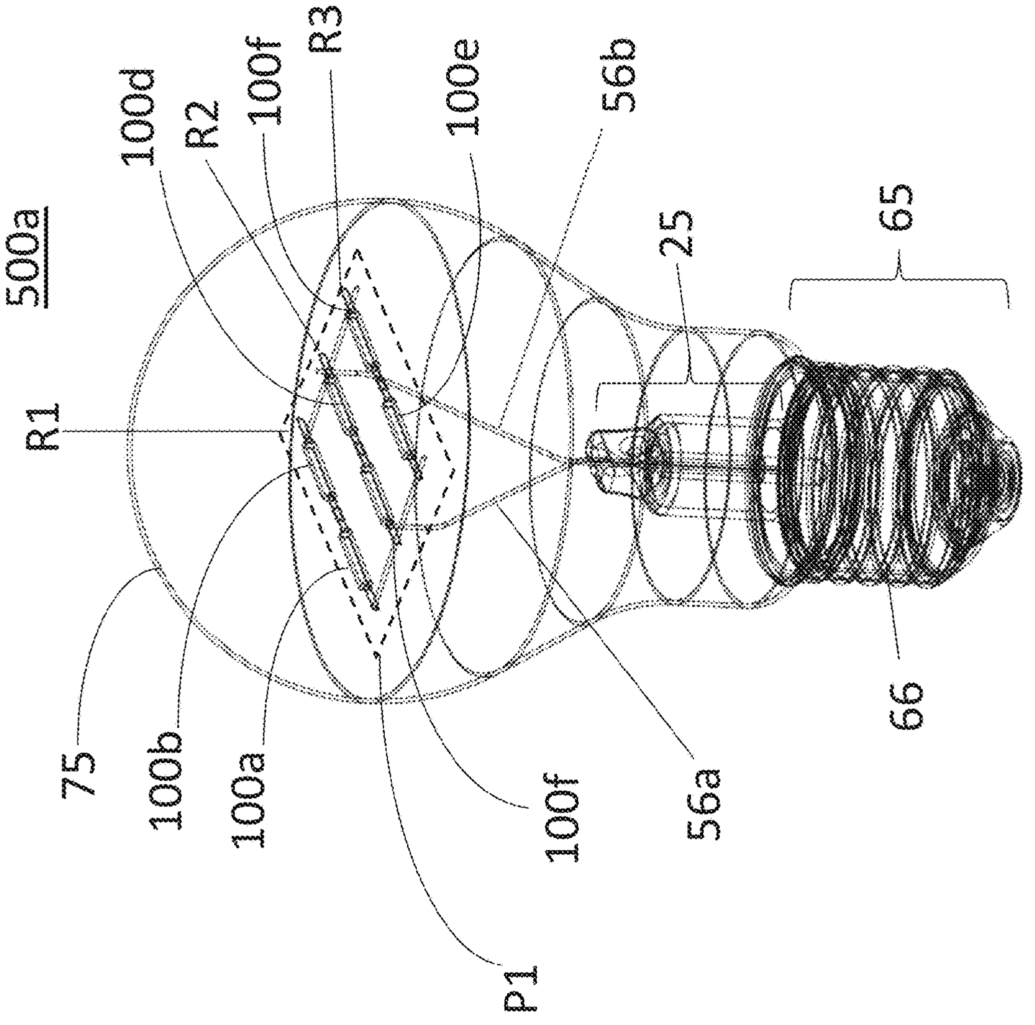
FIG. 1 is a perspective view of a lamp including filament type light sources that can include chip scale package (CSP) light emitting diodes (LEDs) and/or flip chip light emitting diodes (LEDs), in which the filaments have a reduced amount of phosphor and have been configured to be in parallel rows arranged along a single plane, in accordance with one embodiment of the present disclosure.

FIG. 1 illustrates one embodiment of a lamp 500*a* including filament type light sources (LED filaments) 100*a*, 100*b*, 100*c*, 100*d*, 100*e*, 100*f* that can include chip scale package (CSP) light emitting diodes (LEDs) (as illustrated in FIGS. 7-14) and/or flip chip light emitting diodes (LEDs) (as illustrated in FIGS. 15-19C). In the embodiment that is depicted in FIG. 1, the filaments (LED filaments) 100*a*, 100*b*, 100*c*, 100*d*, 100*e*, 100*f* have a reduced amount of phosphor. In the embodiment, depicted in FIG. 1, the filaments 100*a*, 100*b*, 100*c*, 100*d*, 100*e*, 100*f* have been configured to be in parallel rows R1, R2, R3 arranged along a single plane P1. The filaments 100*a*, 100*b*, 100*c*, 100*d*, 100*e*, 100*f* are arranged in such a manner that the effective diameter of the perimeter of the filament array is smaller than the opening to the globe, hereafter referred to as optic 75 of the lamp 500*a*

The LED filaments 100*a*, 100*b*, 100*c*, 100*d*, 100*e*, 100*f* are arranged in an array having electrically conductive edge pathways 55*a*, 55*b*. Each row of LED filaments are connected in series. For example, the first row R1 includes two series connected filaments 100*a*, 100*b*, the second row R2 includes two series connected filaments 100*c*, 100*d*; and the third row R3 includes two series connected filaments 100*e*, 100*f*. The filaments 100*a*, 100*b*, 100*c*, 100*d*, 100*e*, 100*f* are geometrically positioned to provide linear electrical pathways. For example, the filament having reference number 100*a* is connected to the filament having reference number 100*b* so that the angle defined by the body of the filaments connected at the vertex V1 is equal to approximately 180 degrees. Components connected in series are connected along a single "electrical path", and each component has the same current through it, equal to the current through the network. Although each row R1, R2, R3 of filaments 100*a*, 100*b*, 100*c*, 100*d*, 100*e*, 100*f* includes two filaments, the present disclosure is not limited to only this example. For example, embodiments have been contemplated, in which three filaments are present in each row of the array. The number of filaments in a row may be dictated by the size of the individual filaments, and the size of the opening to the optic 75.

Each row R1, R2, R3 is connected by the electrically conductive edge pathways 55*a*, 55*b* in parallel. Components connected in parallel are connected along multiple paths, and each component has the same voltage across it, equal to the voltage across the network. The current through the network is equal to the sum of the currents through each component. Although FIG. 1 illustrates three rows of filaments 100*a*, 100*b*, 100*c*, 100*d*, 100*e*, 100*f*, the present disclosure is not limited to only this example. For example, a single row of filaments may be suitable. In another example, two rows of filaments may be employed. Further, four of five rows of filaments may also be suitable. Similar to the number of filaments in a row, the number of rows employed can be dependent upon the size of the individual filaments, and the size of the opening to the optic 75.

The LED filaments 100*a*, 100*b*, 100*c*, 100*d*, 100*e*, 100*f* are configured to reduce the amount of phosphor that is present therein. The phosphor is present in sufficient amounts to convert the blue light emitted from the LEDs within the filaments 100*a*, 100*b*, 100*c*, 100*d*, 100*e*, 100*f* to white light, however, has been reduced by the methods and structures described with reference to FIGS. 9-19C so that the lighting elements do not appear yellow when in the off state. In some embodiments, the filaments 100*a*, 100*b*, 100*c*, 100*d*, 100*e*, 100*f* incorporate chip scale package (CSP) light emitting diodes (LEDs), as described further below with reference to FIGS. 9-14. In these embodiments, the phosphor is applied to the individual chips, the chips are engaged to the electrically conductive communicative structures that are disposed on the supporting substrate of the filaments, and the structure is coated with a clear adhesive. Further, details regarding the embodiments in which the filaments include the chip scale package (CSP) light emitting diodes (LEDs) are provided below with reference to FIGS. 9-14. In another embodiment, a plurality of LED chips are solder bonded to the electrically conductive communicative structures of the supporting substrate of the filaments, wherein the entirety of the island of flip chip solder bonded LED chips is coated with a thin layer of phosphor. Thereafter, the structure is coated with a clear adhesive. Further, details regarding the embodiments in which the filaments include the island of flip chip light emitting diodes (LEDs) coated with a thin layer of phosphor are provided below with reference to FIGS. 15-19C.

In some embodiments, the outermost electrodes for the LED filaments 100*a*, 100*b*, 100*c*, 100*d*, 100*e*, 100*f* for each row R1, R2, R3 are joined in electrical communication with the electrically conductive edge pathways 55*a*, 55*b*. The electrically conductive edge pathways 55*a*, 55*b* may be composed of a metal structure, such as a metal wire. For example, the electrically conductive edge pathways 55*a*, 55*b* may be composed of molybdenum (Mo) wire. These electrically conductive edge pathways 55*a*, 55*b* may also be composed of nickel (Ni) plated steel or an alternate suitable material.

Still referring to FIG. 1, in some embodiments, the electrical conductive edge pathways 55*a*, 55*b* that are in electrical communication with the rows R1, R2, R3 of filaments 100*a*, 100*b*, 100*c*, 100*d*, 100*e*, 100*f* are in electrical communication with electrically conductive stem pathways 56*a*, 56*b* that connect the array of LED filaments 100*a*, 100*b*, 100*c*, 100*d*, 100*e*, 100*f* to a stem 25, in which the stem 25 and the electrically conductive stem pathways 56*a*, 56*b* contribute to the supporting structure elements for the array of LED filaments. The electrically conductive stem pathways 56*a*, 56*b* may be composed of a molybdenum (Mo) wire, nickel (Ni) plated steel wire or an alternate suitable material. For example, the electrically conductive stem pathways 56*a*, 56*b* may also be a composite wire including an internal lead wire, a Dumet wire (copper-clad nickel steel wire) and an external lead wire joined in this order.

The glass stem 25 houses a portion of the electrically conductive stem pathways 56*a*, 56*b* that bring in DC (direct current) from the driver (not shown) to the LED filaments 100*a*, 100*b*, 100*c*, 100*d*, 100*e*, 100*f*. The glass stem 25 is sealed to the glass bulb, i.e., optic 75, which is evacuated of air via exhaust port and then backfilled with a gas blend of suitably high thermal conductivity.

The glass bulb 75 could belong to any of a number of types of lamp shapes like A19, A21, G, BR, B, C etc. The air from the sealed bulb (optic 75) is evacuated via the exhaust hole 24 located in stem 25. The sealed and exhausted bulb (optic 75) can be backfilled with a suitable gas blend of high thermal conductivity through port 24 and then the tube leading to port 24 (not shown) is tipped off thereby creating a sealed glass bulb (optic 75) containing a suitable gas blend and the light engine.

In some embodiment, the array of LED filaments 100*a*, 100*b*, 100*c*, 100*d*, 100*e*, 100*f* provide a light engine that is incorporated into a lamp 500*a*, in which the array of LED filaments is positioned at light projecting end (present at the optic 75) of the lamp 500*a* and a base 65 of the lamp 500 includes an electrical connector 66 for connection with a lamp fixture.

Figure 2:
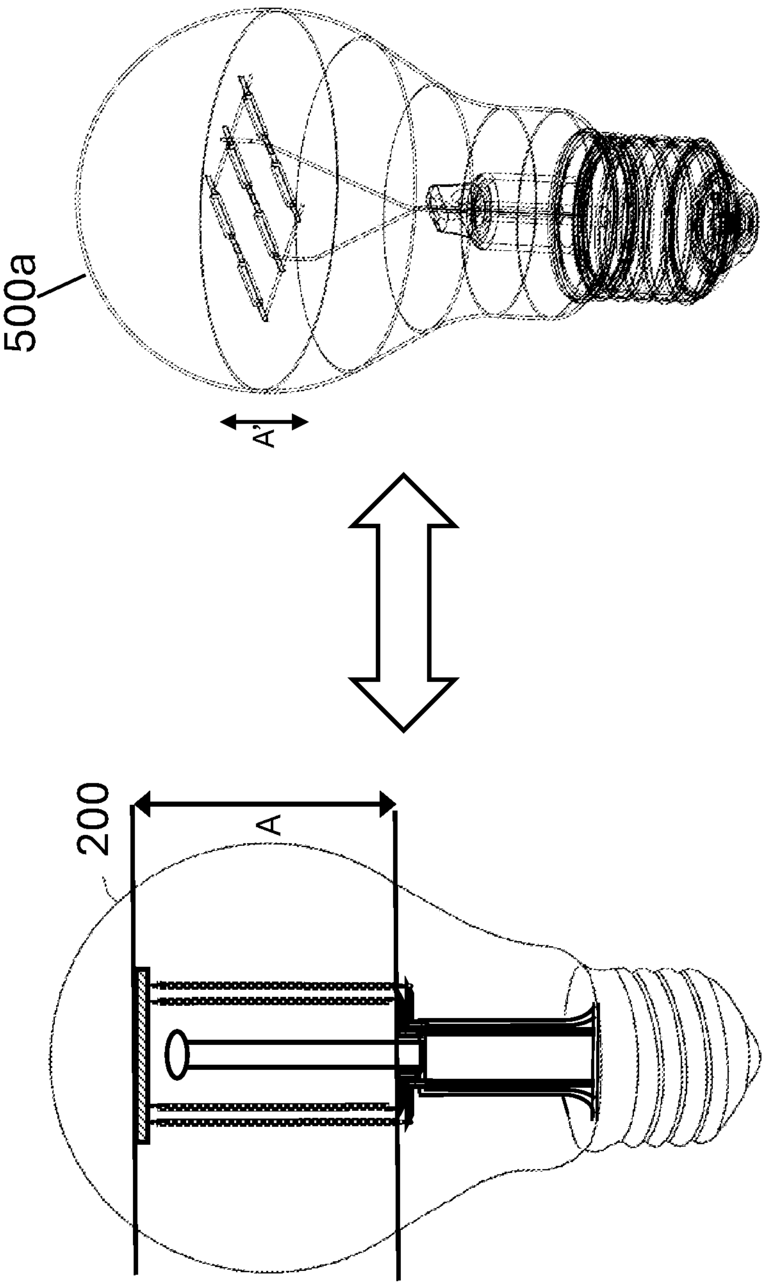
FIG. 2 is a perspective view of a lamp including filament type light sources that can include chip scale package (CSP) light emitting diodes (LEDs) and/or flip chip light emitting diodes (LEDs), in which the filaments are arranged to fill a volume of the, in accordance with one embodiment of the present disclosure.

The light bulb shaped lamp 500*a* is a light bulb shaped LED lamp that can function for replacing an incandescent electric bulb, in which a base 65 is attached to a translucent globe 75. The light engine including the light emitting diode (LED) filament structures 100*a*, 100*b*, 100*c*, 100*d*, 100*e*, 100*f* is housed in the globe 75. The light engine including the light emitting diode (LED) filament structures 100*a*, 100*b*, 100*c*, 100*d*, 100*e*, 100*f* positions the filaments in a reduced volume of the translucent globe 75. This provides that the bulbs incorporating the LEI) filaments of the present design have the appearance that is more similar to a typical incandescent tungsten filament based bulb. First, as noted above, and to be further described below with reference to FIGS. 9-19*c*, the filaments employed in the lamps 500*a*, 500*b*, 500*c*, 500*d*, 500*e*, 500*f*, 500*g*, 500*h* described herein have a lesser amount of phosphor present therein, which reduces the appearance of yellow coloring when the lamps 500*a*, 500*b*, 500*c*, 500*d*, 500*e*, 500*f*, 500*g*, 500*h* are in the off state. Additionally, the reduced size and optimized orientation of the filaments as incorporated in the light engine within the lamp 500*a* also reduce the appearance of yellow coloring within lamps that have LED filaments when in the off state. This is illustrated in FIG. 2. FIG. 2 illustrates one example of a lamp 500*a* with a light engine of reduced phosphor LED filament structures 100*a*, 100*b*, 100*c*, 100*d*, 100*e*, 100*f* in comparison to a comparative example of a lamp 600 having LED filament structures 200 having a thick encapsulating coating of phosphor on LED dies. The phosphor of the LED filament structure 200 in the comparative lamp 600 is not targeted to only cover the LED chips, but instead covers the LED chips and encapsulates the LED filament support substrate. The comparative lamp 600 not only has a distinctive yellow appearance resulting from the increased amount of phosphor, but as illustrated in FIG. 2, the high phosphor content filaments occupy a volume A1 of the lamp 500*a*, which is the majority of the volume within the globe/optic 75. Still referring to FIG. 2, by comparison, the lamp 500*a* of the present disclosure, including the reduced phosphor filaments, have filament dimensions and a geometry of assembly to occupy a lesser volume A2 within the globe/optic 75. In the example depicted in FIG. 2, dimensions for the globe/optic 75 is the same for both the comparative lamp 600 and the lamp 500*a* including the reduced phosphor LED filaments 100*a*, 100*b*, 100*c*, 100*d*, 100*e*, 100*f*. In the example depicted in FIG. 2, comparison of the comparative lamp 600 to the lamp 500*a* that is consistent with FIG. 1 illustrates that the volume A2 of the globe being occupied by the filaments having the optimized geometry and dimensions is less than half the volume A1 that is occupied by the filaments 200 of the comparative lamp 600.

Referring back to FIG. 1, the stem 25 can be in electrical communication with driver electronics, e.g., lighting circuit, in which the driver electronics may be housed within the portion of the base 65 that engages the lamp fixture. The stem 25 can be made of soft glass transparent to visible light.

In some embodiments, the globe 75 is a hollow translucent component, which houses the light engine composed of the LED filaments 100*a*, 100*b*, 100*c*, 100*d*, 100*e*, 100*f* inside, and transmits the light from the light engine to outside of the lamp 500*a*. In some embodiments, the globe 75 is a hollow glass bulb made of silica glass transparent to visible light. The globe 75 can have a shape with one end closed in a spherical shape, and the other end having an opening. In some embodiments, the shape of the globe 75 is that a part of hollow sphere is narrowed down while extending away from the center of the sphere, and the opening is formed at a part away from the center of the sphere. In the embodiment that is depicted in FIG. 1, the shape of the globe 75 is Type A (JIS C7710) which is the same as a common incandescent light bulb. It is noted that this geometry is provided for illustrative purposes only, and is not intended to limit the present disclosure. For example, the shape of the globe 75 may also be Type G, Type BR, or others. The portion of the globe 75 opposite the opening may be referred to as the "dome portion of the optic".

Still referring to FIG. 1, the light engine of the filaments 100*a*, 100*b*, 100*c*, 100*d*, 100*e*, 100*f* is positioned within the globe 75 by connection to the electrically conductive stem pathways 56*a*, 56*b* (also referred to as lead wires) that are supported by the stem 25. The stem 25 is a pillar extended toward the inside of the globe 75. In some embodiments, the stem structure 25 is positioned between the light engine and the driver electronics that are in the base 65. In some embodiments, the other end portion of the body of the stem 25 opposite the portion from which the leads electrically conductive stem pathways 56*a*, 56*b* extend to the light engine includes a flared shape that can be coinciding with the shape of the opening. The portion of the body of the stem 25 formed in the flared shape can be joined with the opening of the globe 75 so as to close the opening of the globe 75. In other embodiments, the flared shape of the stem 25 may engage a first surface of the base housing 65 and the globe 75 and may also contact a second separate surface of the base housing 65, wherein between the base housing 65, the globe 75 and the flared end portion of the stem 25, a sealed structure is provided. In addition, parts of two electrically conductive stem pathways 56*a*, 56*b* (also referred to as lead wires) can be partially sealed in the stem 25. Accordingly, it is possible to supply power to the light engine in the globe 75 from outside of the globe 75 keeping the globe 75 airtight. Accordingly, the light bulb shaped lamp 500*a* can prevent water or water vapor from entering the globe 75 for a long period of time, and it is possible to suppress the degradation of the light engine and a part connecting the light engine and the electrically conductive stem pathways 56*a*, 56*b* due to moisture.

In some embodiments, driver electronics, e.g., a lighting circuit (a circuit for causing the LEDs of the plurality of light emitting diode (LED) filament structures 100*a*, 100*b*, 100*c*, 100*d*, 100*e*, 100*f* to emit light), are housed in the base housing 65. More specifically, in one embodiment, the driver electronics, e.g., lighting circuit, includes a plurality of circuit elements, and a circuit board on which each of the circuit elements is mounted. In this embodiment, the driver electronics, e.g., lighting circuit, converts the AC power received from the base 66 of the base housing 65 to the DC power, and supplies the DC power to the LEDs of the plurality of light emitting diode (LED) filament structures 100*a*, 100*b*, 100*c*, 100*d*, 100*e*, 100*f* through the two lead wires (electrically conductive stem pathways 56*a*, 56*b*). In one embodiment, the driver electronics may be provided by a lighting circuit that may include a diode bridge for rectification, a capacitor for smoothing, and a resistor for adjusting current. The lighting circuit is not limited to a smoothing circuit, but may be an appropriate combination of light-adjusting circuit, voltage booster, and others.

The driver electronics may be housed within a base housing 65 that is composed of a resin material. The base housing 65 can be provided at the opening of the globe 75. More specifically, the base housing 65 is attached to the globe 75 using an adhesive such as cement to cover the opening of the globe 75. The base electrode 66 is connected to the end of the base housing 65 that is opposite the end of the base housing 65 that is closest to the globe 75. In some embodiments, the base electrode 66 is provided by an E26 base. The light bulb shaped lamp 500*a* can be attached to a socket for E26 base connected to the commercial AC power source for use. Note that, the base 66 does not have to be an E26 base, and may be a base of other size, such as E17. In addition, the base 66 does not have to be a screw base, and may be a base in a different shape such as a plug-in base.

Figure 3:
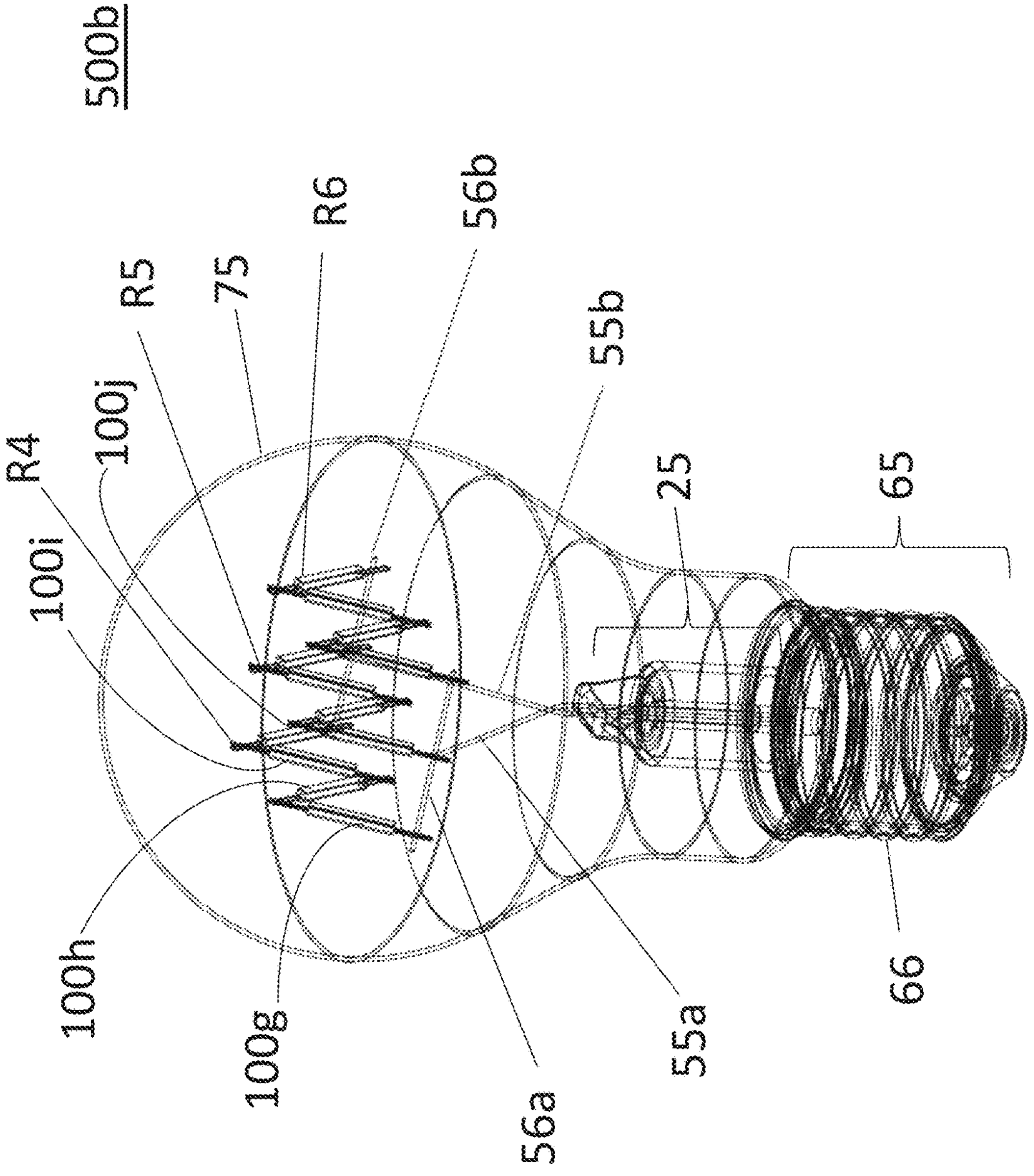
FIG. 3 is a perspective view of a lamp including filament type light sources that can include chip scale package (CSP) light emitting diodes (LEDs) and/or flip chip light emitting diodes (LEDs), in which the filaments have a reduced amount of phosphor and have been configured to be arranged in a parallel rows of chevrons (including inverted chevrons), in accordance with one embodiment of the present disclosure.
Figure 4:
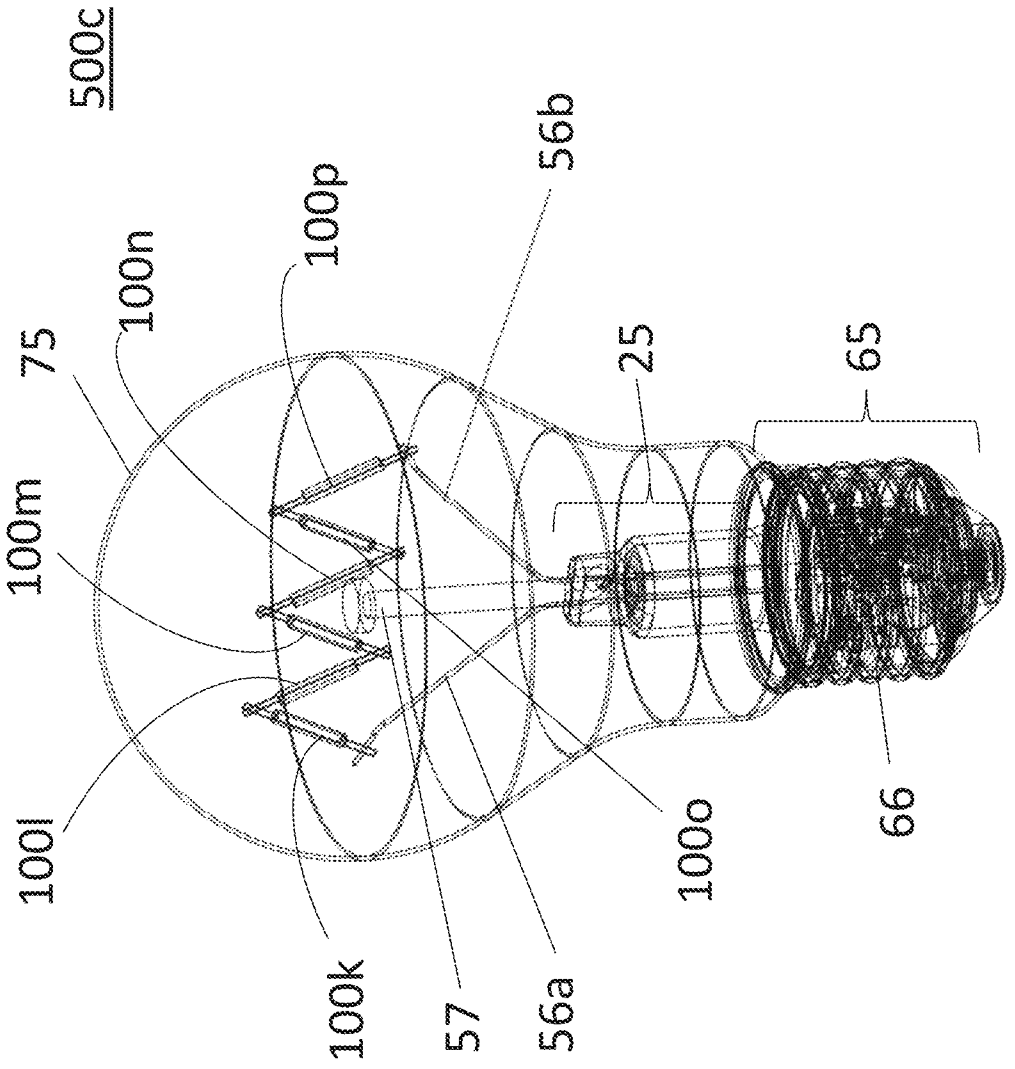
FIG. 4 is a perspective view of a lamp including filament type light sources that can include chip scale package (CSP) light emitting diodes (LEDs) and/or flip chip light emitting diodes (LEDs), in which the filaments have a reduced amount of phosphor and have been configured to be arranged in a single row of chevrons (including inverted chevrons), in accordance with one embodiment of the present disclosure.

It is noted that the arrangement/geometry of the LED filaments 100*a*, 100*b*, 100*c*, 100*d*, 100*e*, 100*f* that is depicted in FIG. 1 is only one example of a geometry that is suitable for employing the low phosphor filaments, e.g., filaments, as described with reference to FIGS. 9-19*c*, in a lamp structure. For example, FIGS. 3 and 4 illustrate some embodiment for arranging filaments in a chevron including geometry. A "chevron" is a pattern having the shape of a V or an inverted V. As depicted in FIGS. 3 and 4, two filaments may be at their ends and joined in series, in which filaments are angled to be non-linear with respect to one another and to provide the V-shape of a chevron. Each pair of filaments can provide one chevron. In the example depicted in FIG. 3, there are three rows R4, R5, R6 of filaments arranged in chevron patterns. The first row R4 includes four filaments 100*g*, 100*h*, 100*i*, 100*j*, which are arranged to provide two inverted V chevrons. The second row R5 and the third row R6 of filaments have a same arrangement as the first row R4 of chevron patterned filaments. Similar to the arrangement of filaments that are configured to be in parallel rows R1, R2, E3 arranged along a single plane P1 for the embodiment depicted in FIG. 1, the parallel rows R4, R5, R6 of chevron patterned filaments depicted in FIG. 3 may be connected at their ends by electrically conductive edge pathways 55*a*, 55*b*. The electrically conductive edge pathways 55*a*, 55*b* are electrically connected to the electrically conductive stem pathways 56*a*, 56*b* (lead wires) that extend from the stem 25. The electrically conductive edge pathways 55*a*, 55*b* and the electrically conductive stem pathways 56*a*, 56*b* (lead wires) are similar to the structures having the same reference numbers depicted in FIG. 1. Therefore, the description of the electrically conductive edge pathways 55*a*, 55*b* and the electrically conductive stem pathways 56*a*, 56*b* (lead wires) from FIG. 1 is suitable for describing these elements having the same reference numbers in FIG. 3.

The number of LED filament structures in the example depicted in FIG. 3 is equal to 12. However, any number of LED filaments may be employed so long as the assembly can fit within the opening of the globe 75 during assembly, and the number of filaments does not negatively impact the coloring of the light engine to appear yellow. Additionally, the number of rows is not limited to three rows R4, R5, R6. For example, the embodiment depicted in FIG. 4 includes a single row R7 of series connected LED filaments 100*k*, 100*l*, 100*m*, 100*n*, 100*o*, 100*p* arranged in a pattern of abutting chevrons. It is noted that in the example depicted in FIG. 4, the electrically conductive edge pathways 55*a*, 55*b* have been omitted, and the single row R7 of series connected LED filaments 100*k*, 100*l*, 100*m*, 100*n*, 1000, 100*p* are electrically connected directly to the electrically conductive stem pathways 56*a*, 56*b* (lead wires) that extend to the stem 25 of the bulb 500*a*.

The LED filaments 100*g*, 100*h*, 100*i*, 100*j*, 100*k*, 100*l*, 100*m*, 100*n*, 100*o*, 100*p* are configured to reduce the amount of phosphor that is present therein. The phosphor is present in sufficient amounts to convert the blue light emitted from the LEDs within the filaments 100*g*, 100*h*, 100*i*, 100*j*, 100*k*, 100*l*, 100*m*, 100*n*, 100*o*, 100*p* to white light. However, the amount of phosphorus has been reduced by the methods and structures described with reference to FIGS. 9-19C so that the lighting elements do not appear yellow when in the off state. In some embodiments, the filaments 100*g*, 100*h*, 100*l*, 100*j*, 100*k*, 100*l*, 100*m*, 100*n*, 100*o*, 100*p* incorporate chip scale package (CSP) light emitting diodes (LEDs), as described further below with reference to FIGS. 9-14. In these embodiments, the phosphor is applied to the individual chips, the chips are engaged to the electrically conductive communicative structures that are disposed on the supporting substrate of the filaments, and the structure is coated with a clear adhesive. Further, details regarding the embodiments in which the filaments include the chip scale package (CSP) light emitting diodes (LEDs) are provided below with reference to FIGS. 9-14. In another embodiment, a plurality of LED chips are solder bonded to the electrically conductive communicative structures of the supporting substrate of the filaments, wherein the entirety of the island of flip chip solder bonded LED chips is coated with a thin layer of phosphor. Thereafter, the structure is coated with a clear adhesive. Further, details regarding the embodiments in which the filaments include the island of flip chip light emitting diodes (LEDs) coated with a thin layer of phosphor are provided below with reference to FIGS. 15-19C.

The light bulb shaped lamp 500*b*, 500*c* depicted in FIGS. 3 and 4 is a light bulb shaped LED lamp that can function for replacing an incandescent electric bulb. The light engine including the chevron patterned light emitting diode (LED) filament structures 100*g*, 100*h*, 100*i*, 100*j*, 100*k*, 100*l*, 100*m*, 100*n*, 100*o*, 100*p* is housed in the globe 75. The light engine including the light emitting diode (LED) filament structures 100*g*, 100*h*, 100*i*, 100*j*, 100*k*, 100*l*, 100*m*, 100*n*, 100*o*, 100*p* positions the filaments in a reduced volume of the translucent globe 75. This provides that the bulbs incorporating the LED filaments of the present design have the appearance that is more similar to a typical incandescent tungsten filament based bulb. First, as noted above, and to be further described below with reference to FIGS. 9-19*c*, the filaments employed in the lamps 500*b*, 500*c* depicted in FIGS. 3 and 4 have a lesser amount of phosphor present therein, which reduces the appearance of yellow coloring when the lamps 500 are in the off state. Additionally, the reduced size and optimized orientation of the filaments as incorporated in the light engine within the lamp 500*b*, 500*c* also reduce the appearance of yellow coloring within lamps that have LEI) filaments when in the off state. Similar to the comparison of the lamp 500*a* depicted in FIG. 1 to the comparative lamp 600 depicted in FIG. 2, the chevron patterned LED filaments for the light engine of the lamp 500*b*, 500*c* depicted in FIGS. 3 and 4 occupy a lesser volume within the globe/optic 75 than prior designs of LED filament bulbs.

The optic 75, stem 25, base 65, base electrode 66 and driver electronics for the bulbs 500*b*, 500*c* depicted in FIGS. 3 and 4, are similar to these same structures having same reference numbers that have been described for the bulb 500*a* depicted in FIG. 1. Therefore, the description of the optic 75, stem 25, base 65, base electrode 66 and driver electronics for the bulbs 500*a* depicted in FIG. 1 is suitable for describing some embodiment of similar structures having the same reference numbers in FIGS. 3 and 4.

Figure 5:
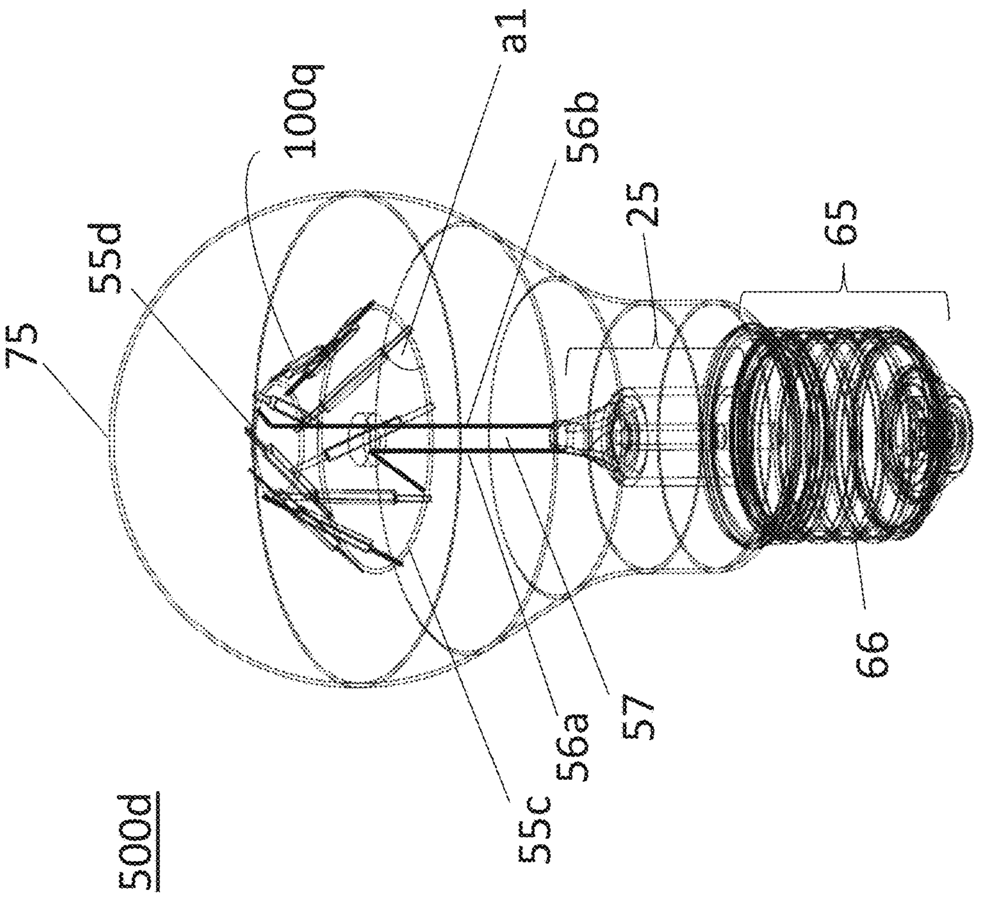
FIG. 5 is a perspective view of a lamp including filament type light sources that can include chip scale package (CSP) light emitting diodes (LEDs) and/or flip chip light emitting diodes (LEDs), in which the filaments have a reduced amount of phosphor and have been configured to be arranged in a cone geometry of angled filaments, in accordance with one embodiment of the present disclosure.
Figure 6:
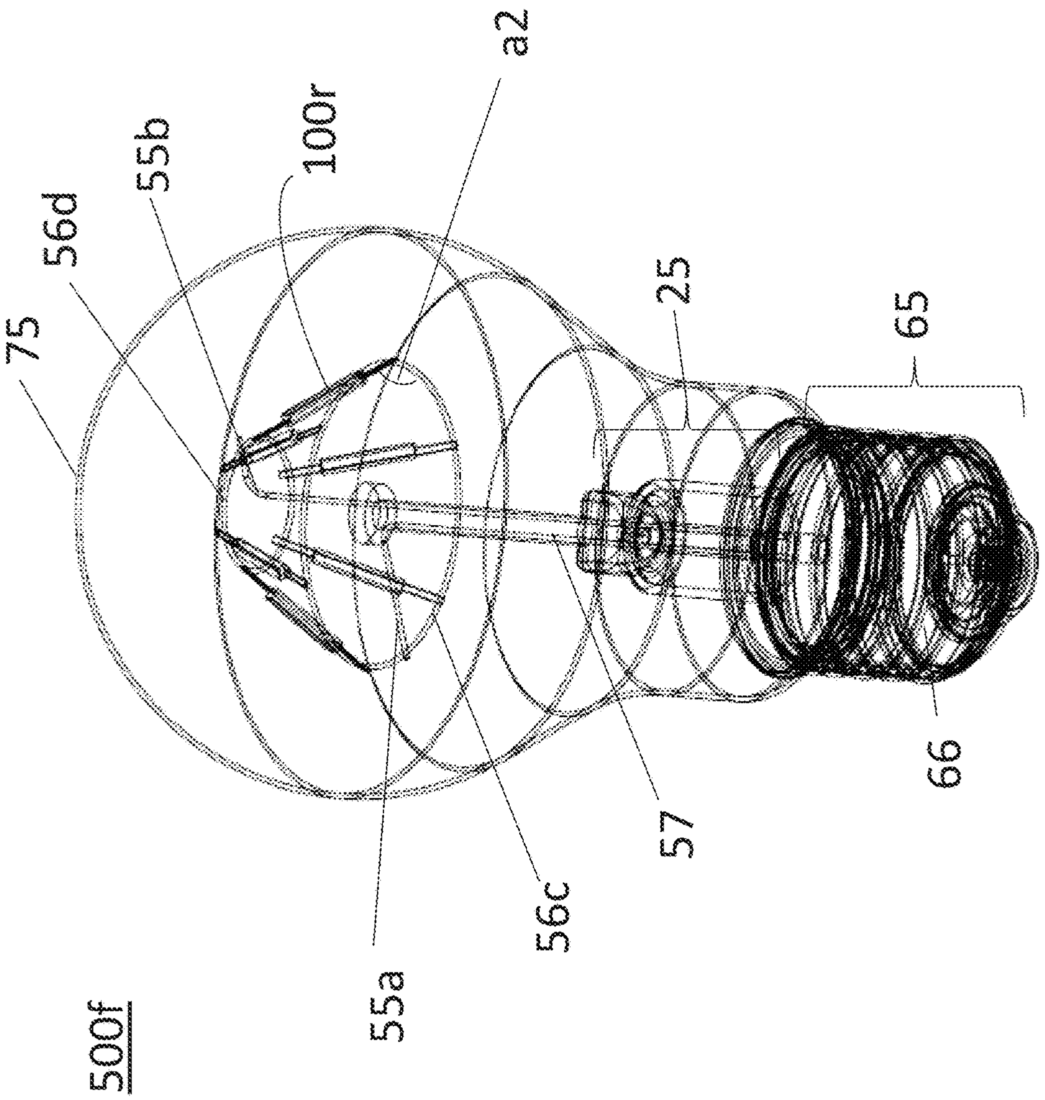
FIG. 6 is a perspective view of a lamp including filament type light sources that can include chip scale package (CSP) light emitting diodes (LEDs) and/or flip chip light emitting diodes (LEDs), in which the filaments have a reduced amount of phosphor and have been configured to be arranged in a cone geometry of parallel adjacent filaments, in accordance with one embodiment of the present disclosure.

FIGS. 5 and 6 depict yet another embodiment of a bulb 500*d*, 500*e* including filament type light sources that can include chip scale package (CSP) light emitting diodes (LEDs) and/or flip chip light emitting diodes (LEDs), in which the filaments have a reduced amount of phosphor. FIG. 5 illustrates one embodiment, in which the filaments 100*q* have been arranged in a cone geometry of angled filaments al. FIG. 6 illustrates another embodiment, in which the filaments 100*r* have been arranged in a cone geometry of parallel adjacent filaments. In the embodiments depicted in FIGS. 5 and 6, the filaments 100*q*, 100*s* are arranged in such a manner that the effective diameter of the circle formed by the top of the filaments, i.e., portion closest to the upper dome of the optic 75 (also referred to as globe), is smaller than that formed by the bottom of the filaments, i.e., portion closest to the electrode for communication with the lamp fixture. In other words, the filaments 100*q*, 100*s* are arranged in a conical geometry with the diameter of the base of the filament cone being larger than the diameter of the top of the cone. At the base of the cone is a first ring electrically conductive pathway 55*c* and at the top of the filament cone is a second ring electrically conductive pathway 55*d*. The first ring electrically conductive pathway 55*c* is in electrical communication with a first electrode of the filament LEDs at the base of the cone, and the second ring electrically conductive pathway 55*d* is in electrical communication with a second electrode of the filament LEDs at the top of the cone. As noted in the embodiment depicted in FIG. 5 the LEDs 100*q* are angled. Referring to FIG. 5, in some embodiments, the angle α1 can exceed 15° and being less than 30°. As noted in the embodiment depicted in FIG. 6, the adjacent LED filaments 100*q* are parallel to one another. Referring to FIG. 5, in some embodiments, the angle α2 can be equal to 90°.

The first ring electrically conductive pathway 55*c* and the second ring electrically conductive pathway 55*d* are similar to the electrically conductive edge pathways 55*a*, 55*b* depicted in FIGS. 1 and 3. For example, the first and second ring electrically conductive pathways 55*c*, 55*d* may be composed of a metal structure, such as a metal wire. For example, the first and second ring electrically conductive pathways 55*c*, 55*d* may be composed of molybdenum (Mo) wire. The first and second ring electrically conductive pathways 55*c*, 55*d* may also be composed of nickel (Ni) plated steel or an alternate suitable material.

Still referring to FIGS. 5 and 6, the first and second ring electrically conductive pathways 55*c*, 55*d* are centered over a mandrel 57 that extends from the stem 25. The mandrel 57 may be provided by a glass rod. In some embodiments, there is a button atop the top surface of the mandrel 30. Similar to the mandrel 57, the button may also be composed of glass. The mandrel 57 and button may also be present in the embodiment depicted in FIG. 4. However, in the embodiment depicted in FIG. 4, there is no physical connection between the filaments and the mandrel 57, but the provision is there for this connection. In the embodiments depicted in FIGS. 5 and 6, the electrically conductive stem pathways 56*a*, 56*b* extend from the stem 25 through the mandrel 57 into electrical contact with the first and second ring electrically conductive pathways 55*c*, 55*d*, in which the integration of the electrically conductive stem pathways 56*a*, 56*b* into the mandrel 57 provides added mechanical stability for the assembly of the LED filaments.

The optic 75, stem 25, base 65, base electrode 66 and driver electronics for the bulbs 500*d*, 500*e* depicted in FIGS. 5 and 6, are similar to these same structures having same reference numbers that have been described for the bulb 500*a* depicted in FIG. 1. Therefore, the description of the optic 75, stem 25, base 65, base electrode 66 and driver electronics for the bulbs 500*a* depicted in FIG. 1 is suitable for describing some embodiment of similar structures having the same reference numbers in FIGS. 5 and 6.

Figure 7:
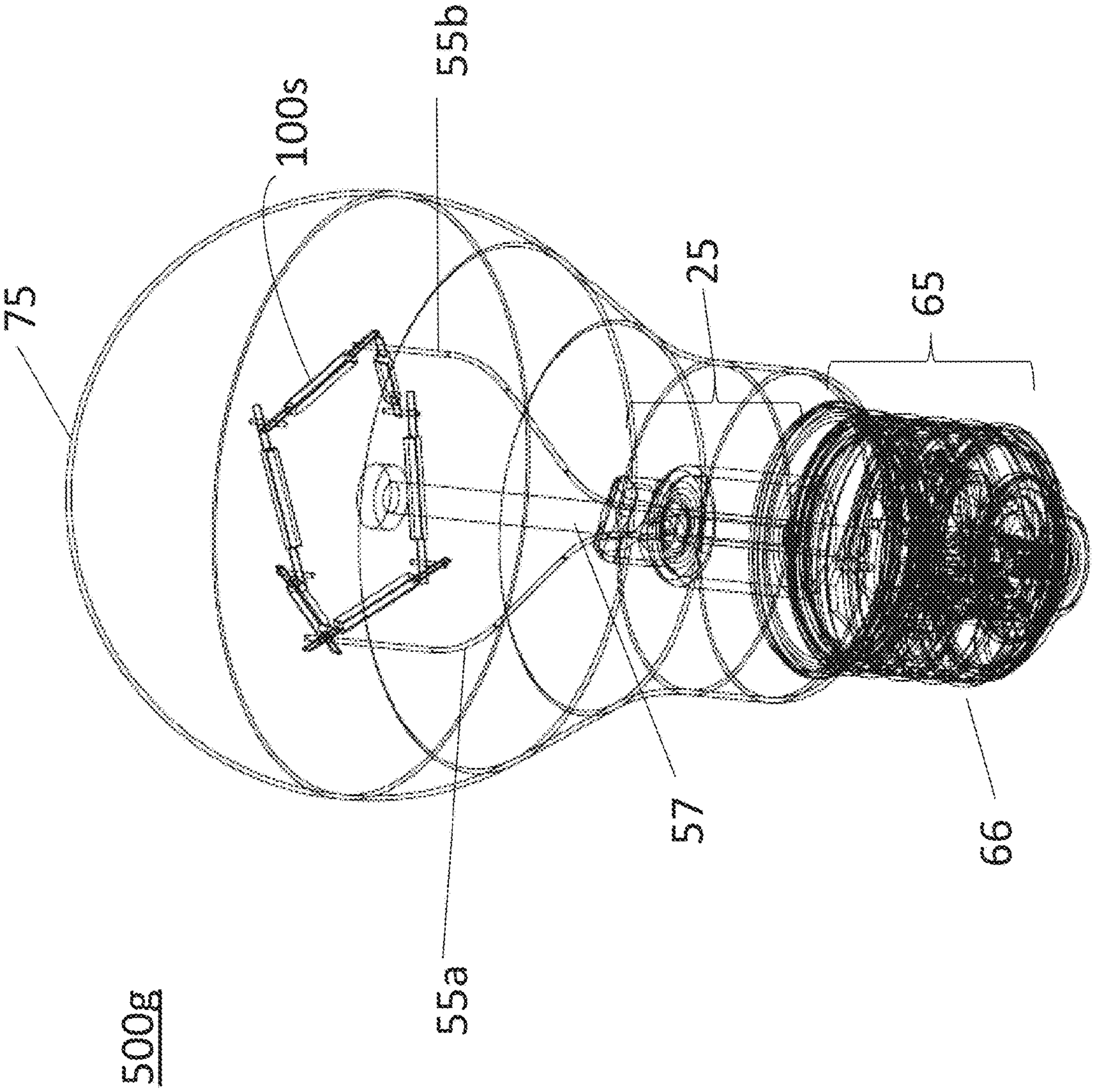
FIG. 7 is a perspective view of a lamp including filament type light sources that can include chip scale package (CSP) light emitting diodes (LEDs) and/or flip chip light emitting diodes (LEDs), in which the filaments have a reduced amount of phosphor and have been configured to be define a perimeter having a hexagon geometry arranged on a single plane, the perimeter around a central axis of the stem, in accordance with one embodiment of the present disclosure.

FIG. 7 is a perspective view of a lamp 500*g* including filament type light sources that can include chip scale package (CSP) light emitting diodes (LEDs) and/or flip chip light emitting diodes (LEDs), in which the filaments 100*s* have a reduced amount of phosphor and have been configured to be define a perimeter having a hexagon geometry arranged on a single plane, the perimeter around a central axis of the stem 25. The ring of filaments 100*s* may include six filaments that can be positioned to form a perimeter about the mandrel 57 that extends from the step 25. The ring of filaments 100*s* can be electrically connected to the electrically conductive stem pathways 56*a*, 56*b* that extend from the stem 25.

Similar to the description of the filaments 100*a*, 100*b*, 100*c*, 100*d*, 100*e*, 100*f*, 100*g*, 100*h*, 100*i*, 100*j*, 100*k*, 100*l*, 100*m*, 100*n*, 100*o*, 100*p*, 100*q* that are depicted in FIGS.

1-6, the filaments 100*s* depicted in FIG. 7 have a reduced phosphor amount. The amount of phosphor has been reduced by the methods and structures described with reference to FIGS. 9-19C so that the lighting elements do not appear yellow when in the off state. In some embodiments, the filaments 100*s* incorporate chip scale package (CSP) light emitting diodes (LEDs), as described further below with reference to FIGS. 9-14. In another embodiment, a plurality of LED chips are solder bonded to the electrically conductive communicative structures of the supporting substrate of the filaments, wherein the entirety of the island of flip chip solder bonded LED chips is coated with a thin layer of phosphor. Thereafter, the structure is coated with a clear adhesive. Further, details regarding the embodiments in which the filaments include the island of flip chip light emitting diodes (LEDs) coated with a thin layer of phosphor are provided below with reference to FIGS. 15-19C. Similar to the comparison of the lamp 500*a* depicted in FIG. 1 to the comparative lamp 600 depicted in FIG. 2, the lamp 500*g* including the filaments configured to define a perimeter about the mandrel 57 and having the hexagon geometry depicted in FIG. 7 occupies a lesser volume within the globe/optic 75 than prior designs of LED filament bulbs.

The optic 75, stem 25, base 65, base electrode 66 and driver electronics for the bulbs 500*g* depicted in FIG. 7, are similar to these same structures having same reference numbers that have been described for the bulb 500*a* depicted in FIG. 1. Therefore, the description of the optic 75, stem 25, base 65, base electrode 66 and driver electronics for the bulbs 500*a* depicted in FIG. 1 is suitable for describing some embodiment of similar structures having the same reference numbers in FIG. 7.

Figure 8:
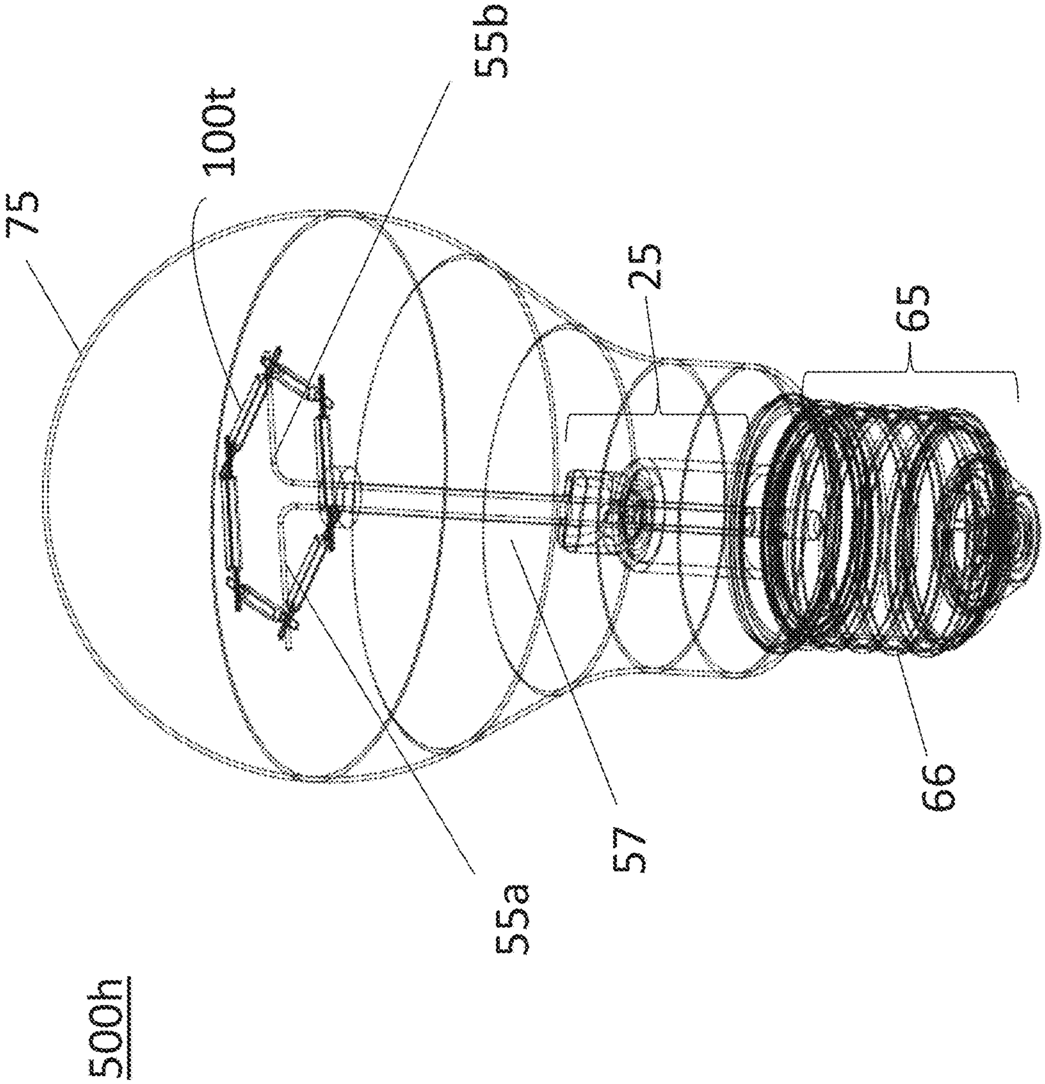
FIG. 8 is a perspective view of a lamp including filament type light sources that can include chip scale package (CSP)

FIG. 8 is a perspective view of a lamp 500*h* including filament type light sources that can include chip scale package (CSP) light emitting diodes (LEDs) and/or flip chip light emitting diodes (LEDs), in which the filaments 100*t* have a reduced amount of phosphor and have been configured to be define a perimeter having an octagon geometry arranged on a single plane. The perimeter defined by the filaments 100*t* is positioned around a central axis of the stem 25. The ring of filaments 100*t* can be electrically connected to the electrically conductive stem pathways 56*a*, 56*b* that extend from the stem 25 through the mandrel 57.

Similar to the description of the filaments 100*a*, 100*b*, 100*c*, 100*d*, 100*e*, 100*f*, 100*g*, 100*h*, 100*i*, 100*j*, 100*k*, 100*l*, 100*m*, 100*n*, 100*o*, 100*p*, 100*q* that are depicted in FIGS. 1-6, the filaments 100*t* depicted in FIG. 7 have a reduced phosphor amount. The amount of phosphor has been reduced by the methods and structures described with reference to FIGS. 9-19C so that the lighting elements do not appear yellow when in the off state. In some embodiments, the filaments 100*s* incorporate chip scale package (CSP) light emitting diodes (LEDs), as described further below with reference to FIGS. 9-14. In another embodiment, a plurality of LED chips are solder bonded to the electrically conductive communicative structures of the supporting substrate of the filaments, wherein the entirety of the island of flip chip solder bonded LED chips is coated with a thin layer of phosphor. Thereafter, the structure is coated with a clear adhesive. Further, details regarding the embodiments in which the filaments include the island of flip chip light emitting diodes (LEDs) coated with a thin layer of phosphor are provided below with reference to FIGS. 15-19C. Similar to the comparison of the lamp 500*a* depicted in FIG. 1 to the comparative lamp 600 depicted in FIG. 2, the lamp including the filaments 100*r* configured to define a perimeter about the mandrel 57 and having the octagon geometry depicted in FIG. 8 occupies a lesser volume within the globe/optic 75 than prior designs of LED filament bulbs.

The optic 75, stem 25, base 65, base electrode 66 and driver electronics for the bulb 500*a* depicted in FIG. 8, are similar to these same structures having same reference numbers that have been described for the bulb 500*a* depicted in FIG. 1. Therefore, the description of the optic 75, stem 25, base 65, base electrode 66 and driver electronics for the bulbs 500*a* depicted in FIG. 1 is suitable for describing some embodiment of similar structures having the same reference numbers in FIG. 8.

FIG. 9 illustrates another example of a lamp including filament type light sources 100*w* that can include chip scale package (CSP) light emitting diodes (LEDs) and/or flip chip light emitting diodes (LEDs), in which the filaments 100*w* have a reduced amount of phosphor and have been configured to be define a single chevron (having an apex at the top) positioned within a candle shaped bulb 75. The single chevron may be provided by two filaments 100*w* that are connected at one end to provide the apex for the chevron. The opposing ends of the filaments are connected to leads heading into the stem.

FIG. 10 illustrates another example of a lamp including filament type light sources that can include chip scale package (CSP) light emitting diodes (LEDs) and/or flip chip light emitting diodes (LEDs), in which the filaments 100*v* have a reduced amount of phosphor and have been configured to be define a two chevrons positioned within a globe shaped bulb 75. Each of the two chevrons is provided by two filaments 100*v*. The two chevrons are separately connected to leads heading into the stem.

FIG. 11 is a photograph of a lamp including filament type light sources 100*u*1, 100*u*2 that can include six (6) chip scale package (CSP) light emitting diodes (LEDs) and/or flip chip light emitting diodes (LEDs), in which the filaments 100*u*1, 100*u*2 have a reduced amount of phosphor and have been configured to be define a light engine element of two chevrons. Each of the chevrons is composed of two filaments 100*u*1 to provide two apexes. The chevrons of filaments are connected by base filaments 100*u*2. The light engine depicted in FIG. 11 is positioned within a globe shaped bulb.

As noted above, for each of the embodiments depicted in FIGS. 1-11, the filaments 100*a*, 100*b*, 100*c*, 100*d*, 100*e*, 100*f*, 100*g*, 100*h*, 100*i*, 100*j*, 100*k*, 100*l*, 100*m*, 100*n*, 100*o*, 100*p*, 100*q*, 100*s*, 100*t*, 100*u*1, 100*u*2, 100*v*, 100*w* (collectively referred to hereafter as "filaments 100") can include chip scale package (CSP) light emitting diodes (LEDs), as described with reference to FIGS. 12-17.

Chip Scale Package (CSP) LEDs are Lambertian emitters presenting the highest luminance at smallest size available on the market. Chip scale package light emitting diodes do not include bond wires. When employing chip scale package LEDs, the LEDs are attached, e.g., bonded, to a substrate, in which a circuit, e.g., printed circuit, provides for electrical communications to the individual CSP LEDs In this embodiment, the CSP LED arrays are then coated with a clear transparent or translucent material having a very high transmittance with no phosphor. In some embodiments, white diffusive powder may be added into the adhesive, and the material can be translucent. This embodiment reduce the use of phosphor layers. By eliminating the encapsulating phosphor, the yellow coloring that is necessarily associated with phosphor is also eliminated from the design.

Referring to FIGS. 12-15, in some embodiments, to provide filaments 100 including a reduced phosphor content, the methods and structures begin with a filament geometry that is relatively small. For example, the length L1 can range from 3 mm to 30 mm, and the width W1 generally ranges from 0.3 mm to 2.0 mm. The diameter D1 of a filament can range from 0.6 mm to 2 mm.

Referring to FIGS. 12-15, the filament structure 100 includes a base substrate 160 (also referred to as a stent or stent substrate). Atop the base substrate 160 is an insulating layer 165, and a conductor layer 170 may be present atop the insulating layer 165. The insulating layer 165 provides for electrical isolation of the chip scale package (CSP) light emitting diodes (LEDs) 150 and the base substrate 160. A circuit 154, e.g., printed circuit, provides for electrical communication between the chip scale package (CSP) light emitting diodes (LEDs) 150, and a conductive layer 170 that provides the electrode to the filament structure 100. The circuit 154 can be viewed in the top down perspective view that is depicted in FIG. 14.

Referring to FIGS. 12-15, encapsulating the chip scale package (CSP) light emitting diodes (LEDs) 150, the insulating layer 165, the conductor layer 170 and the base substrate 160 is a transparent layer 170. The transparent layer 170 provides an element of protection for the chip scale package (CSP) light emitting diodes (LEDs) 50, as well as functioning for light diffusion to avoid light spotting of the light being emitted by the individually affixed chip scale package (CSP) light emitting diodes (LEDs) 150.

In some embodiments, the base substrate 160 can act as a frame and provides for structural stability of the filament structure 100. In some examples, the base substrate 160 is composed of a metal. Examples of metals suitable for the base substrate 160 can include stainless steel, copper, brass, aluminum, aluminum alloy, tungsten and combinations thereof. It is noted that the above provided metal compositions are provided for illustrative purposes only. Other compositions are equally applicable for providing the material of the base substrate 60. In some instances, the material selection is limited by materials that do not allow for the transmission of light.

The atop the base substrate 160 is the insulating layer 165. The metal composition of the base substrate 160 provides sufficient rigidity and does not transmit light therethrough. However, metals are electrically conductive. To provide isolation between the electrically conductive metal of the base substrate 160 and the chip scale package (CSP) light emitting diodes (LEDs) 150, the insulating layer 165 is deposited atop the base substrate prior to forming the printed circuit that provides electrical communication to the chip scale package (CSP) light emitting diodes (LEDs) 150. The insulating layer 165 may be any dielectric/insulating material used in electronics for electrical isolation purposes. For example, the insulating layer 165 can be composed of alumina ($Al_2O_3$), silicon oxide ($SiO_2$), silicon carbide, as well as other metal oxides and ceramics etc. The insulating layer 165 may also be composed of glass fiber and glass fiber/epoxy compositions similar to those employed in FR4 dielectric compositions used in printed circuit boards.

Any dielectric deposition method may be employed in forming the insulating layer. For example, the dielectric material may be deposited onto the base substrate 160 using dip coating, curtain coating, deposition from solution, brush coating, etc. In other examples, a chemical vapor deposition (CVD) process may be employed, such as metal organic chemical vapor deposition (MOCVD) or plasma enhanced chemical vapor deposition (PECVD). In even further embodiments, a physical vapor deposition (PVD) process may be employed, such as deposition via evaporation or deposition by sputtering. In some examples, the evaporation method may be by E-beam evaporation, ion assisted deposition (IAD), thermal evaporation, and combinations thereof. Sputtering methods can include magnetron sputtering, ion beam sputtering, pulsed laser deposition (PLD) and combinations thereof.

To provide the electrical communication to the later engaged chip scale package (CSP) light emitting diodes (LEDs), a printed circuit 154 is formed on the insulating layer 165. The printed circuit 154 includes electrical pathways that are in direct contact with the contacts to the later engaged chip scale package (CSP) light emitting diodes (LEDs) 150 and the later formed electrode layer (conductor layer 170). The printed circuit provides direct electrical communication between the chip scale package (CSP) light emitting diodes (LEDs) 150 and the conductor layer 170. As used herein, "direct electrical contact" denotes electrical communication across a physical electrically conductive medium. In the present case, the physical electrically conductive medium is provided by a metal track (or lead). The metal tracks (or leads) provide separate pathways to the anode and cathode contacts of the chip scale package (CSP) light emitting diodes (LEDs) 150, and to the anode and cathode contacts provided by the conductor layer 170. The metal tracks (also referred to as metal lines or leads) can be formed using a printing method. For example, the metal tracks may be composed of copper, aluminum, tungsten or alloys and combinations thereof. The metal tracks that provide the printed circuit 54 may be formed using printing technology, such as fused deposition modeling (FDM), selective laser sintering (SLS), stereo lithography apparatus (SLA), and combinations thereof.

In some embodiments, the tracks for the printed circuit 154 can lead to pads 151. The pads 151 are the points at which there is direct electrical contact between the printed circuit and the chip scale package (CSP) light emitting diodes (LEDs) 150.

As noted, the chip scale package (CSP) light emitting diodes (LEDs) 150 are engaged to circuit 154. The chip scale package (CSP) light emitting diodes (LEDs) 150 includes an LED die 152, and a phosphor coating 153. As used herein, "LED chip" and "light emitting semiconductor structure" refer to a stack of semiconductor layers, including an active region which emits light when biased to produce an electrical current flow through the device, and contacts attached to the stack. If a substrate on which the semiconductor layers are grown is present, "LED chip" includes the substrate. The active region of the LED can include an n-type region and a p-type region, which can be multiple layer structures of materials having the general formula AlxGayIn1-x-yN (0≤x≤1,0y1, 0x+y≤1), and may further contain group III elements such as boron and thallium. Sometimes, the nitrogen may be replaced by phosphorus, arsenic, antimony, or bismuth. In some embodiments, the n-type region and the p-type region may be composed of a II-VI material. The LED die 152 may emit blue light.

"Phosphor" refers to any luminescent materials which absorb light of one wavelength and emits light of a different wavelength, and "light emitting device" refers to an LED chip coated with a layer, for example a phosphor layer, through which the emitted light passes. The phosphor coating 153 converts the blue light to a suitable white light to be emitted by a lamp.

The phosphor coating 153 provides a method for providing white light from blue light emitted by light emitting diode chip (also referred to as light emitting diode (LED) die 152). The phosphor white method produces white light in a single LED by combining a short wavelength LED such as blue or UV, and a yellow phosphor coating. The blue or UV photons generated in the LED either travels through the phosphor layer without alteration, or they are converted into yellow photons in the phosphor layer. The combinations of the blue and yellow photons combine to generate white light phosphor white may have a color rendering ranging from Ra70 to 85.

In a typical phosphor white manufacturing process, the phosphor coating 153, i.e., phosphor encapsulant, is deposited on the LED die 152. In some embodiments, the LED die 152 of the present disclosure may use a 450 nm-470 nm blue GaN (gallium nitride) LED or a 385 nm to 480 blue LED covered by a yellowish phosphor coating 53 usually made of cerium doped yttrium aluminium garnet (YAG:Ce) crystals which have been powdered and bound in a type of viscous adhesive. The LED chip emits blue light, part of which is converted to yellow by the YAG:Ce.

It is noted that gallium nitride (GaN) is only one example of the composition that may be employed for the LED die 152. Other compositions are equally applicable so long as the light emitted by the selected composition can be converted to white light when passing through the phosphor coating 153. For example, in some embodiments, the composition of the LED die 154 can be indium gallium nitride (InGaN). A common yellow phosphor material composition is cerium-doped yttrium aluminium garnet ($Ce^{3+}$:YAG).

The methods and structures of the present disclosure provide sufficient phosphor to convert the blue light emitted from the LED die 152 to white light. However, the amount of phosphor is minimized to avoid the filament having a yellow color. For example, the phosphor may be disposed on only the light transmission surfaces of the LED die 152. In some examples, the phosphor coating may be present on only the upper surface of the LED die 152, and the sidewall surface of the LED die 152. This is distinguished from prior filament designs that encapsulate the entire array of LEDs, and portions of the substrate separating the adjustment array in a continuous layer of phosphor. In prior designs, the phosphor encapsulant is a blanket deposited layer covering a majority of the filament structure. Contrary to blanket deposited phosphor, the phosphor employed in the designs depicted in FIGS. 12-15, the light emitting diode (LED) chips 150 of the present disclosure includes a light transmission surface that is in contact with an individual portion of phosphor for the LED chip. By "individual portion" it is meant that each light emitting diode includes a discrete portion of phosphor relative to the portions of phosphor on the adjacent light emitting diode. Each light emitting diode 152 gets an individual portion of phosphor 153 that is physically separate and not physically connected to the phosphor that is present on the adjacently positioned light emitting diodes 150 on the substrate. As illustrated in FIGS. 12 and 13, the phosphor 153 may be present on the sidewalls of each LED die 152, and may be present on the upper surface of each LED die 152. As illustrated in FIGS. 1 and 2, no portion of phosphor encapsulant is present overlying the portions 156 of the filament substrate 160 (also referred to as filament stent) extending between the sidewalls of adjacently situated light emitting diodes 152 having phosphor encapsulant 153 present thereon.

In some embodiments, to form the yellow phosphor material, a solid state reaction is employed that can employ sol-gel and (co) precipitation methods. A phosphor 153 can be applied to an LED die 152 by mixing it with a liquid or gel binder, such as epoxy or silicone, which is then applied as a layer to the LED chip. Referring to FIG. 16, in one example, the LED die 152 may be placed within a first tool 158, e.g., part 1 of a mold, defining the perimeter of the chip scale package (CSP) light emitting diodes (LEDs) 50, a blank layer of the yellow phosphor material 153' may be overlayed atop the LEI) die 152, and a second tool 157, part 2 of the mold, deforms the blank layer of yellow phosphor material into direct contact with the upper and sidewalls surface of the LED die 152. It is noted that the tooling depicted in FIG. 16 is only one embodiment of the present disclosure, and the methods and structures described herein should not be limited to only this example, as other methodologies are equally applicable for forming the chip scale package (CSP) light emitting diodes (LEDs) 150.

FIG. 17 illustrates a side cross-sectional view of a chip scale package (CSP) light emitting diode (LED) 50. The LED die 152 has a contact surface including two contacts 161, 162. The two contacts 161, 162 provide the positive and negative (cathode and anode) connections to the LED die. The upper surface is opposite the contact surface including the two contacts 161, 162, and is one of the light transmission surfaces for the LED die 152. At least one portion of the individual phosphor 153 for the chip scale package (CSP) light emitting diode (LED) 150 is in direct contact with the upper surface of the LED die 152. In some embodiments, the phosphor 153 is also present on the sidewall surface of the LED die 152. The phosphor 153 may be a conformal thickness coating. The term "conformal" denotes a layer having a thickness that does not deviate from greater than or less than 30% of an average value for the thickness of the layer. This denotes a range of thickness for the conformal layer having a lower value that is 30% less than the average value for the thickness of the conformal layer to an upper value that is 30% greater than the average value for the thickness of the conformal layer. In some examples, the thickness of the phosphor 153 may range from 150 microns to 500 microns In one example, the thickness of the phosphor 153 is on the order of 300 microns. In some embodiments, because the upper and sidewalls surfaces are entirely covered in phosphor 153, the phosphor may be referred to as a phosphor encapsulant. In some embodiments, the phosphor 153 can be present solely on the upper surface of the LED die 152, as in some embodiments, it is not necessary for the phosphor 153 to be on the upper surface of the die.

Referring to FIGS. 12-17, the chip scale package (CSP) light emitting diode (LED) 150 are very compact. For example, the chip scale package (CSP) light emitting diode (LED) 150 may have a width and depth dimension ranging on the order of 2 mm to 5 mm, and a thickness ranging from 0.25 mm to 1.0 mm. In one example, the chip scale package (CSP) light emitting diode (LED) 150 measures 2.4 mm (wide)×2.4 mm (depth)×0.6 mm (height). In this example, the LED die 152 of the or the light-emitting surface (LES) of the chip scale package (CSP) light emitting diode (LED)s 150 is 2.1 mm×2.1 mm.

The chip scale package (CSP) light emitting diode (LED) 150 can be engaged to the contact pads of the circuit. The connective means may be any conventional adhesive or metal bumps such as solder, gold, or aluminum, and is referred to as metal bumps (also referred to as solder bumps) 159. The term "solder", as used herein, refers to any metal or metallic compound or alloy that is melted and then allowed to cool in order to join two or more metallic surfaces together. Generally speaking, solders have melting temperatures in the range of 150° C. to 250° C. Solder bumps may be small spheres of solder (solder balls) that are bonded to contact areas, interconnect lines or pads of the LEDs 150 and the printed circuit 154. In some embodiments, the solder bumps can be made from lead-free solder mixtures or lead tin solder. In some examples, the chip scale package (CSP) light emitting diode (LED) 150 can then be picked and placed by either a high precision die bonder (with solder printed on substrate pads), or by a regular pick-place machine (also sometimes called a chip shooter).

The chip scale package (CSP) light emitting diode (LED) 150 may be engaged through their contacts 161, 162 to the pads of the circuit 154 by the metal bumps 159. It is noted that the above example is provided for illustrative purposes only. Any surface mount technology or electrically conductive adhesive may also be used to connect the chip scale package (CSP) light emitting diode (LED) 50 to the circuit 54.

The number of chip scale package (CSP) light emitting diodes (LEDs) 150 that are engaged to the filament structure can be dependent upon application, and the size of the filament structures, as well as the light requirements for the performance of the filament light emitting diodes (LEDs). Although the example depicted in FIGS. 14 and 15 includes sixteen (16) chip scale package (CSP) light emitting diodes (LEDs) 150, the present disclosure is not limited to only this example. For example, the number of chip scale package (CSP) light emitting diodes (LEDs) 150 in a single LED filament may range from 10 LEDs to 40 LEDs. In one example, the number the number of chip scale package (CSP) light emitting diodes (LEDs) 150 in a single LED filament may be equal to 28 LEDs.

Referring to FIGS. 14-20, the conductor layer 170 may be formed in direct electrical contact with the circuit 154 that brings electrical communication with the chip scale package (CSP) light emitting diode (LED) 150. The conductor layer 170 that is formed on opposing sides of the filament structure can provide the cathode and anode connections for the device. The conductor layer 170 may be formed atop the insulating layer 165. The conductor layer 170 may be formed using plating, electroplating, electroless plating etc. The conductor layer 170 may also be formed using printed technology similar to that described above for forming the circuit 154.

Still referring to FIGS. 12-17, the entirety of the structure, i.e., the chip scale package (CSP) light emitting diode (LED) 150, the circuit 154, the insulating layer 165, the conductor layer 170 and the substrate 160 may be encapsulated in a transparent layer 175. The transparent layer 175 may be composed of polymeric material, such as silicon glue, epoxy resin, polycarbonate, acrylic and combinations thereof. In some embodiments, the assembly of the chip scale package (CSP) light emitting diode (LED) 150, the circuit 154, the insulating layer 165, the conductor layer 170 and the substrate 160 are placed within a mold, and then the polymeric material that provides the composition of the transparent layer 175 is then injected into the mold around the entirety of the structure including the chip scale package (CSP) light emitting diode (LED) 150. The ends of the structure provided by the ends of the conductor layer 170 are not coated and provide the electrical connections, e.g., anode and cathode, to the filament structure.

The transparent layer 175 can provide both additional structure support for engaging the chip scale package (CSP) light emitting diodes (LEDs) 150 to the filament structure, and can also provide protection to the chip scale package (CSP) light emitting diodes (LEDs) 150. Additionally, the transparent layer 175 can also diffuse light that is being emitted by the chip scale package (CSP) light emitting diode (LED) 150. By diffusing the light emitted by the chip scale package (CSP) light emitting diode (LED) 150, light spotting is reduced.

It is noted that the above description of the filaments 100 including the chip scale package (CSP) light emitting diodes (LEDs) is provided for illustrative purposes, and that variations to the above described examples are within the scope of the present disclosure.

As noted above, for each of the embodiments depicted in FIGS. 1-11, the filaments 100*a*, 100*b*, 100*c*, 100*d*, 100*e*, 100*f*, 100*g*, 100*h*, 100*i*, 100*j*, 100*k*, 100*l*, 100*m*, 100*n*, 100*o*, 100*p*, 100*q*, 100*s*, 100*t*, 100*u*1, 100*u*2, 100*w*, 100*v* (collectively referred to hereafter as "filaments 100") can include flip chip light emitting diodes (LEDs), as described with reference to FIGS. 18-22*c*. Flip chip (FC) LED technology includes installing the LE) chip upside down (therefore why it is called "flipped"), and directly soldering the chip to the electrical pathway for energizing the LEDs. A flip chip LED design relies upon the soldering for electrical connectivity, and there is no need for physical wiring to bring electrical signal to the energize the light generating element of the LED. Similar to the embodiments described with reference to FIGS. 12-17, the flip chip light emitting diodes (LED) including filaments have a geometry that is relatively small to provide a reduced phosphor content. For example, the length L1 can range from 3 mm to 30 mm, and the width W1 generally ranges from 0.3 mm to 2.0 mm. The diameter D1 of a filament can range from 0.6 mm to 2 mm.

In some embodiments, using flip chip (FC) technology, the LEDs are engaged to the substrate which includes a printed electrical circuit to provide electrical communication to the LEDs. In a following step, the LED chips are covered with a thin layer of phosphor. In some embodiments, the thin layer of phosphor encapsulates the plurality of flip chip LEDs with a single continuous and conformal layer. The single continuous and conformal phosphor layer is particularly thin, which facilitates a reduced amount of phosphor being employed in the design. For example, the thickness of the single continuous and conformal phosphor layer may range from 150 microns to 500 microns.

The single continuous and conformal thickness phosphor layer may extend across the entirely of flip chip LEDs on a single filament substrate, e.g., filament stent, in which the single phosphor layer bridges across the space separating the adjacently positioned flip chip LED's. It is further noted that the single continuous and conformal thickness layer for the phosphor may be present on only the side of the filament substrate (also referred to as filament stent) that the flip chip LEDs are present on.

FIGS. 18-21 illustrate one embodiment of a filament structure 100 including Flip Chip (FC) light emitting diodes (LEDs) 250 as the light source (also referred to as light engine) for the filament. The filament structure 100 includes a base substrate 260 (also referred to as a stent or stent substrate). Atop the base substrate 260 is an insulating layer 265, and a conductor layer 270 may be present atop the insulating layer 265. The insulating layer 265 provides for electrical isolation of the Flip Chip (FC) light emitting diodes (LEDs) 250 and the base substrate 260. A circuit 254, e.g., printed circuit, provides for electrical communication between the Flip Chip (FC) light emitting diodes (LEDs) 250, and a conductive layer 270 that provides the electrode to the filament structure 100. The circuit 254 can be viewed in the top down perspective view that is depicted in FIG. 20.

The plurality of Flip Chip (FC) light emitting diodes (LEDs) 250 can be in electrical communication through series connection, and may be referred to as an array of Flip Chip (FC) light emitting diodes (LEDs) 250. The array of Flip Chip (FC) light emitting diodes (LEDs) 250 can be linearly disposed along the length L1 of the base substrate

260. The entire array of Flip Chip (FC) light emitting diodes (LEDs) 250 may be referred to an island.

In some embodiments, a majority of the Flip Chip (FC) light emitting diodes (LEDs) 250 are covered with a layer of phosphor. In some embodiments, the layer of phosphor extends continuously over the entire array of LEDs 250, e.g., the entire island of LEDs 50, that are present in the filament 100. For example, the layer of phosphor 253 may be a single layer that is in direct contact with the upper surfaces of the LEDs 250, and bridges across the spaces separating the adjacent LEDs in the array. In some instances, an air gap 255 may be present under the portion of the phosphor layer 253 that bridges across the spaces separating the adjacent LEDs in the array.

The insulating layer 265 depicted in FIGS. 18-21 is similar to the insulating layer 165 that has been described above for the embodiments depicted in FIGS. 12-17. Therefore, the description of the insulating layer 165 depicted in FIGS. 12-17 is suitable for describing at least one embodiment of the insulating layer 265 depicted in FIGS. 18-21.

The conductor layer 270 depicted in FIGS. 18-21 is similar to the conductor layer 170 that has been described above for the embodiments depicted in FIGS. 12-17. Therefore, the description of the conductor layer 270 depicted in FIGS. 12-17 is suitable for describing at least one embodiment of the conductor layer 170 depicted in FIGS. 18-21.

The base substrate 260 depicted in FIGS. 18-21 is similar to the base substrate 160 that has been described above for the embodiments depicted in FIGS. 12-17. Therefore, the description of the base substrate 160 depicted in FIGS. 12-17 is suitable for describing at least one embodiment of the base substrate 260 depicted in FIGS. 18-21.

Referring to FIGS. 18-21, encapsulating the Flip Chip (FC) 250, the insulating layer 265, the conductor layer 270 and the base substrate 260 is a transparent layer 270. The transparent layer 270 provides an element of protection for the chip scale package (CSP) light emitting diodes (LEDs) 260, as well as functioning for light diffusion to avoid light spotting of the light being emitted by the individually affixed chip scale package (CSP) light emitting diodes (LEDs) 250.

The Flip Chip (FC) light emitting diodes (LEDs) 250 are engaged to circuit 254. The active region of the LED can include an n-type region and a p-type region, which can be multiple layer structures of materials having the general formula $Al_xGa_yIn_{1-x-y}N$ (0≤x≤1,0y1,0x+y≤1), and may further contain group III elements such as boron and thallium. Sometimes, the nitrogen may be replaced by phosphorus, arsenic, antimony, or bismuth. In some embodiments, the n-type region and the p-type region may be composed of a II-VI material. The LED 50 may emit blue light. In some embodiments, the LEDs 250 are Flip Chip (FC) light emitting diodes (LEDs). A Flip Chip (FC) can be referred to as having a "wireless bonded chip architecture". A Flip Chip (FC) light emitting diode (LED) has an architecture that is distinguishable from a conventional wire bond LED package. The architecture of a conventional wire bond LEI) package has the active area of the semiconductor chip facing upwards as the chip is mounted onto the substrate or board with epoxy, usually with a dielectric layer in between In a conventional wire bond LED package, wires are then used to interconnect bonding pads on the outer edges of the active area of the chip to the external circuitry of the substrate or board it is mounted on. These bonding pads are located on the outsides of the active area in order to minimize the amount of wiring needed to reach them. In this arrangement, light emits from the top of the chip and heat dissipates through the bottom.

In contrast to a wire bond LED, the wireless bonded architecture of a flip chip (FC) light emitting diode (LED) 250 flips the design upside down (literally) by rotating the orientation of the emissive elements of the chip, allowing an unobstructed path for light from the chip to the viewer. FIGS. 22A-22C illustrate one embodiment of a Flip Chip (FC) light emitting diode (LED) 250. FIG. 22A illustrates a top view, and FIG. 22C illustrates a side view. The bonding pads 256*a*, 256*b* for the Flip Chip (FC) light emitting diode (LED) 250 are depicted in FIG. 22B, which is a bottom view. The bonding pad identified by reference number 256*b* can be to the cathode of the light emitting diode (LED) 250. The boding pad identified by reference number 56*a* can be to the anode of the light emitting diode (LED) 250.

Though, ultimately a Flip Chip (FC) light emitting diode (LED) 250 delivers a more efficient product and requires fewer materials overall than a wire type connected diode, the design does include an additional step in manufacturing. Towards the end of the chip manufacturing process for the Flip Chip (FC) light emitting diode (LED) 250, the bonding pads 256*a*, 256*b* on the active surface of the chip receive a small dot of solder 257. Unlike with wire bonding, these pads do not necessarily need to be located on or near the outside edges of the surface since rather than connecting to external circuitry via wires looped around the other layers of the chip, they are simply attached to the circuitry, e.g., circuit 254 (such as printed circuit), directly through thermosonic bonding or reflow soldering. These bonds 257 leave a small sliver of space between the surface of the active area of the chip and the surface of the substrate or board. In some embodiments, the space can be filled with epoxy to act as a thermal bridge heat can use to escape.

The bonding pads 256*a*, 256*b* of the Flip Chip (FC) light emitting diode (LED) 50 can be engaged to the contact pads of the circuit 254. The connective means may be any conventional adhesive or metal bumps such as solder, gold, or aluminum, and is referred to as metal bumps (also referred to as solder bumps) 257. The term "solder", as used herein, refers to any metal or metallic compound or alloy that is melted and then allowed to cool in order to join two or more metallic surfaces together. Generally speaking, solders have melting temperatures in the range of 150° C. to 250° C. Solder bumps 257 may be small spheres of solder (solder balls) that are bonded to contact areas, interconnect lines or pads of the LEDs 250 and the printed circuit 254. In some embodiments, the solder bumps 257 can be made from lead-free solder mixtures or lead tin solder. In some examples, the Flip Chip (FC) light emitting diode (LED) 250 can then be picked and placed by either a high precision die bonder (with solder printed on substrate pads), or by a regular pick-place machine (also sometimes called a chip shooter).

Referring to FIGS. 22A-22C, the flip chip (FC) light emitting diode (LED) 250 can be very compact. For example, the flip chip (FC) light emitting diode (LED) 50 may have a width W2 and depth L2 dimension ranging on the order of 2 mm to 5 mm, and a thickness T1 ranging from 0.25 mm to 1.0 mm. In one example, the flip chip (FC) light emitting diode (LED) 250 measures 2.4 mm (W2)×2.4 mm (L2)×0.6 mm (T1).

The number of flip chip (FC) light emitting diode (LED) 50 that are engaged to the filament structure can be dependent upon application, and the size of the filament structures, as well as the light requirements for the performance of the filament light emitting diodes (LEDs). Although the example depicted in FIGS. 20 and 21 includes sixteen (16) flip chip (FC) light emitting diode (LED) 250, the present disclosure is not limited to only this example. For example, the number of flip chip (FC) light emitting diode (LED) 250 in a single LED filament may range from 10 LEDs to 40 LEDs. In one example, the number the number of flip chip (FC) light emitting diode (LED) 250 in a single LED filament may be equal to 28 LEDs.

Referring to FIGS. 18-21, a continuous phosphor layer 253 is present overlying the plurality of light emitting diode (LED) chips 250 (e.g., Flip Chip (FC) Light Emitting Diodes (LEDs) "Phosphor" refers to any luminescent materials which absorb light of one wavelength and emits light of a different wavelength, and "light emitting device" refers to an LED chip coated with a layer, for example a phosphor layer, through which the emitted light passes. The phosphor coating 253 converts the blue light to a suitable white light to be emitted by a lamp.

The phosphor coating 253 provides a method for providing white light from blue light emitted by light emitting diode chip (LED) 250. The phosphor white method produces white light in a single LED by combining a short wavelength LED such as blue or UV, and a yellow phosphor coating. The blue or UV photons generated in the LED either travels through the phosphor layer without alteration, or they are converted into yellow photons in the phosphor layer. The combinations of the blue and yellow photons combine to generate white light. Phosphor white may have a color rendering ranging from Ra 70 to 85.

In some embodiments, the LED 250 of the present disclosure may use a 450 nm-470 nm blue GaN (gallium nitride) LED or a 385 nm to 480 blue LED covered by a yellowish phosphor coating 253 usually made of cerium doped yttrium aluminium garnet (YAG:Ce) crystals which have been powdered and bound in a type of viscous adhesive. The LED chip emits blue light, part of which is converted to yellow by the YAG:Ce.

It is noted that gallium nitride (GaN) is only one example of the composition that may be employed for the LED 250. Other compositions are equally applicable so long as the light emitted by the selected composition can be converted to white light when passing through the phosphor coating 253. For example, in some embodiments, the composition of the LED 250 can be indium gallium nitride (InGaN). A common yellow phosphor material composition is cerium-doped yttrium aluminium garnet ($Ce3+$:YAG).

The methods and structures of the present disclosure provide sufficient phosphor to convert the blue light emitted from the flip chip LED 250 to white light. However, the amount of phosphor is minimized to avoid the filament having a highly observable yellow color. For example, the phosphor coating 253 may be present in limited thicknesses ranging from 150 microns to 500 microns. In one example, the phosphor layer 53 has a thickness of 300 microns. The thickness of the phosphor layer may be equal to 100 microns, 150 microns, 200 microns, 250 microns, 300 microns, 350 microns, 400 microns, 450 microns or 500 microns. It is noted that the thickness of the phosphor layer 253 can have any range of values employing any of the values from the prior sentence as a minimum value for the range and any of the values from the prior sentence as a maximum for the range. Further, the phosphor may be disposed on only the array of LEDs 250 (also referred to as an island of LEDs), and only on the side of the substrate 260 that the LEDs 250 are present on. This is distinguished from prior filament designs that encapsulate the entire array of LEDs together with the entirety of the length of the substrate that the LEDs are present on. In prior designs, the phosphor encapsulant is a blanket deposited layer covering a majority of the filament structure, e.g., on both sides of the substrate 260, which includes the side of the substrate that does not include the LEDs 250. Contrary to blanket deposited phosphor of prior designs, for the phosphor layer 253 employed in the designs depicted in FIGS. 15-18, the phosphor is only formed on the portion of the filament that the flip chip light emitting diodes (LED) chips 250 of the present disclosure.

When describing the phosphor layer 253, the term "continuous" means that there are no breaks or cuts or openings in the phosphor layer across the island of LEDs 250 that the phosphor layer 253 is covering. Referring to FIG. 19, in some embodiments, the continuous phosphor layer 253 includes first portions F1 that are in direct contact with at least a light transmission surface (e.g., top surface) of the light emitting diode (LED) chips 250, and second portions F2 that bridge across the space separating adjacently positioned light emitting diodes 250. In some embodiments, the phosphor 253 may fill the space between the adjacently positioned light emitting diodes 250. However, in some embodiments, the phosphor layer 253 bridges entirely over the space between the adjacent LEDs 250 leaving an air gap encapsulated therein.

Referring to FIGS. 1 and 2, the continuous phosphor layer 253 may be present on the end sidewalls S1 of the light emitting diodes 250 at the edges of the array. Referring to FIG. 20, continuous phosphor layer 253 can also be present on an exterior sidewall S2 of the Flip Chip (FC) light emitting diodes (LEDs) 250.

The phosphor layer 253 can be deposited onto the array of LEDs 250 after they are bonded into electrical communication with the circuit 254, e.g., by solder bonding, as per flip chip methods. In some embodiments, to form the yellow phosphor material, a solid state reaction is employed that can employ sol-gel and (co) precipitation methods.

In some embodiments, the phosphor layer 253 is formed on the LED 250 by mixing a phosphor containing composition with a liquid or gel binder, such as epoxy or silicone, which is then applied as a layer to the array of LED chips 250 using paint, or brush application In some embodiments, a coating process may be employed, such as a spray application or ink jet application. In yet other embodiments, the phosphor layer 253 can be applied to the array of LEDs 250 by mixing it with a liquid or gel binder, such as epoxy or silicone, which is then applied as a layer to the LED chips 250 by transfer and press.

In some embodiments, the phosphor layer 253 may be a conformal thickness coating. In some examples, the thickness of the phosphor 53 may range from 150 microns to 500 microns. In one example, the thickness of the phosphor 53 is on the order of 300 microns.

Referring to FIGS. 18-21, the conductor layer 270 may be formed in direct electrical contact with the circuit 254 that brings electrical communication with the Flip Chip (FC) light emitting diode (LED) 250. The conductor layer 270 that is formed on opposing sides of the filament structure can provide the cathode and anode connections for the device. The conductor layer 70 may be formed atop the insulating layer 265. The conductor layer 270 may be formed using plating, electroplating, electroless plating etc. The conductor layer 270 may also be formed using printed technology similar to that described above for forming the circuit 254.

In some embodiments, the Flip Chip (FC) LED arrays are then coated with a clear transparent or translucent material having a very high transmittance with no phosphor. In some embodiments, white diffusive powder may be added into the adhesive, and the material can be translucent. This embodiment reduce the use of phosphor layers. By eliminating the encapsulating phosphor, the yellow coloring that is necessarily associated with phosphor is also eliminated from the design.

Still referring to FIGS. 18-21, the entirety of the structure, i.e., the continuous phosphor layer 253, the flip chip (FC) light emitting diode (LED) 250, the circuit 254, the insulating layer 265, the conductor layer 270 and the substrate 260 may be encapsulated in a transparent layer 275. The transparent layer 275 may be composed of polymeric material, such as silicon glue, epoxy resin, polycarbonate, acrylic and combinations thereof. In some embodiments, the assembly of the continuous phosphor layer 253, the flip chip (FC) light emitting diode (LED) 250, the circuit 254, the insulating layer 265, the conductor layer 270 and the substrate 260 are placed within a mold, and then the polymeric material that provides the composition of the transparent layer 275 is then injected into the mold around the entirety of the structure including the flip chip (FC) light emitting diode (LED) 250. The ends of the structure provided by the ends of the conductor layer 270 are not coated and provide the electrical connections, e.g., anode and cathode, to the filament structure.

The transparent layer 275 can provide both additional structure support for engaging the flip chip (FC) light emitting diodes (LEDs) 250 to the filament structure, and can also provide protection to the flip chip (FC) light emitting diodes (LEDs) 250. Additionally, the transparent layer 275 can also diffuse light that is being emitted by the flip chip (FC) light emitting diodes (LEDs) 250. By diffusing the light emitted by the flip chip (FC) light emitting diodes (LEDs) 250, light spotting is reduced. In some embodiments, the transparent layer 275 may be omitted.

In some embodiments, a method for assembling a filament light emitting diode 100 is provided that includes forming a circuit 254 on a filament stent substrate 260. In some examples, the circuit 254 has pads arranged along a length of the filament stent substrate 260. In some embodiments, the method includes bonding light emitting diode (LED) chips 250 to the circuit, the light emitting diode chips 250 including a light emitting diode (LED) die having contacts 256*a*, 256*b* on a contact surface side of the LED chips 250 for the bonding to the pads of the printed circuit 254. The bonding of the light emitting diode (LED) 250 to the circuit 254 can include solder bonding.

The method can further include forming a continuous phosphor layer 253 on the plurality of light emitting diodes. The phosphor layer 253 can include includes first portions F1 of the continuous phosphor layer 253 that are in direct contact with at least a light transmission surface of the light emitting diode (LED) chips 250, and second portions F2 of the continuous phosphor layer 253 that bridge across the space separating adjacently positioned light emitting diodes 250. The light transmission surface may be the surface of the LED 250 that is opposite the surface of the LED that is bonded to the circuit 254 of the filament 100. The continuous phosphor layer 253 may have a conformal thickness. In some embodiments, the continuous phosphor layer 253 is only present on a side of the filament stent substrate that the Flip Chip (FC) Light Emitting Diodes (LEDs) are also present on. The phosphor layer 253 may have a composition including cerium doped yttrium aluminium garnet (YAG:Ce) crystals.

In some embodiments, after forming the conformal phosphor layer 253, a transparent encapsulant 275 is formed over at least the light emitting diodes (LED) 250. The transparent encapsulant 275 may be omitted.

It is to be appreciated that the use of any of the following "f", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B. and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of a light emitting diode filament lamp with reduced phosphor light emitting diode filaments, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lamp comprising:

electrical leads extending into a supporting stem, the electrical leads in communication with a base electrode; and a light engine comprising light emitting diode filaments, the light emitting diode filaments comprising a circuit having a plurality of contact pads arranged along a length of a substrate, and light emitting diode (LED) chips engaged to the contact pads along the length of the substrate to provide that the light emitting diode (LED) chips are electrically connected in series, wherein each light emitting diode (LED) chip includes at least a light transmission surface that is in contact with an individual portion of phosphor for the LED chip, the individual portion of phosphor having a conformal thickness.

2. The lamp of claim 1, wherein the light emitting diode filaments have been configured to be in parallel rows arranged along a single plane.

3. The lamp of claim 1, wherein the light emitting diode filaments have been configured to be arranged in a parallel rows of chevrons.

4. The lamp of claim 1, wherein the light emitting diode filaments have been configured to be arranged in a single row of chevrons.

5. The lamp of claim 1, wherein the light emitting diode filaments have been configured to be in a cone geometry of angled filaments.

6. The lamp of claim 1, wherein the light emitting diode filaments have been configured to be in a cone geometry of parallel adjacent filaments.

7. The lamp of claim 1, wherein the light emitting diode filaments have been configured to define a perimeter having a hexagon geometry arranged on a single plane, the perimeter around a central axis of the stem.

8. The lamp of claim 1, wherein the light emitting diode filaments have been configured to define a perimeter having an octagon geometry arranged on a single plane, the perimeter around a central axis of the stem.

9. The lamp of claim 1, wherein air encapsulant present over at least the light emitting diode chips.

10. The lamp of claim 1, wherein a length for the LED filament ranges from 3 mm to 30 mm, and a width for the LED filament ranges from 0.3 mm to 2.0 mm.

11. A lamp comprising:

electrical leads extending into a supporting stem, the electrical leads in communication with a base electrode, and a light engine comprising light emitting diode filaments, the light emitting diode filaments comprising a circuit having a plurality of contact pads arranged along a length of a substrate, and a plurality of light emitting diode (LED) chips, wherein each light emitting diode chip in the plurality of chips is engaged to a set of contact pads along the length of the substrate, and a continuous phosphor layer overlying the plurality of light emitting diode (LED) chips, wherein the continuous phosphor layer including first portions that are in direct contact with at least a light transmission surface of the light emitting diode (LED) chips and second portions that bridge across the space separating adjacently positioned light emitting diodes, the second portions that bridge across the space separating adjacently positioned light emitting diodes encapsulating an air gap therein.

12. The lamp of claim 11, wherein the plurality of light emitting diode (LED) chips comprise Hip Chip (FC) light emitting diodes (LEDS).

13. The lamp of claim 11, wherein the light emitting diode filaments have been configured to be in parallel rows arranged along a single plane.

14. The lamp of claim 11, wherein the light emitting diode filaments have been configured to be arranged in a parallel rows of chevrons.

15. The lamp of claim 11, wherein the light emitting diode filaments have been configured to be arranged in a single row of chevrons.

16. The lamp of claim 11, wherein the light emitting diode filaments have been configured to be in a cone geometry of angled filaments.

17. The lamp of claim 11, wherein the light emitting diode filaments have been configured to be in a cone geometry of parallel adjacent filaments.

18. The lamp of claim 11, wherein the light emitting diode filaments have been configured to define a perimeter having a hexagon geometry arranged on a single plane, the perimeter around a central axis of the stem.

19. The lamp of claim 11, wherein the light emitting diode filaments have been configured to define a perimeter having an octagon geometry arranged on a single plane, the perimeter around a central axis of the stem.

20. The lamp of claim 11, wherein an encapsulant present over at least the light emitting diode chips.

* * * * *